(12) United States Patent
Fujita

(10) Patent No.: US 7,948,853 B2
(45) Date of Patent: May 24, 2011

(54) OPTICAL DISC DEVICE AND OPTICAL INFORMATION RECORDING METHOD

(75) Inventor: Goro Fujita, Kanagawa (JP)

(73) Assignee: Sony Corporation, Tokyo (JP)

( * ) Notice: Subject to any disclaimer, the term of this patent is extended or adjusted under 35 U.S.C. 154(b) by 335 days.

(21) Appl. No.: 12/325,428

(22) Filed: Dec. 1, 2008

(65) Prior Publication Data

US 2009/0147652 A1 Jun. 11, 2009

(30) Foreign Application Priority Data

Dec. 5, 2007 (JP) ................. 2007-314766

(51) Int. Cl.
G11B 7/00 (2006.01)
(52) U.S. Cl. ...................................... 369/103
(58) Field of Classification Search .................. 369/103, 369/44.37, 44.26, 44.27, 44.28
See application file for complete search history.

(56) References Cited

U.S. PATENT DOCUMENTS

| 7,706,233 | B2 * | 4/2010 | Horimai et al. ............... 369/103 |
| 2009/0168632 | A1 | 7/2009 | Miyamoto et al. | |

FOREIGN PATENT DOCUMENTS

| JP | 62-020147 | | 1/1987 |
| JP | 2007-179676 | A | 7/2007 |
| JP | 2007-220206 | A | 8/2007 |
| JP | 2007-287245 | A | 11/2007 |

* cited by examiner

*Primary Examiner* — Nabil Z Hindi

(74) *Attorney, Agent, or Firm* — Wolf, Greenfield & Sacks, P.C.

(57) ABSTRACT

An optical disc device that irradiates a light beam on an optical disc having a recording layer in which information is recorded and a positioning layer in which tracks for specifying a recording position of the information in the recording layer are provided includes an information recording unit that irradiates a light beam for information on a target position in the recording layer to record the information by shifting a position in an optical axis direction of the light beam for information, a terminal-end recognizing unit that recognizes, when new information is recorded in a recording layer having a recorded area in which information is already recorded, a terminal end of the recorded area, and a target-position setting unit that sets the target position to separate the terminal end of the recorded area and a start end of a recording planned area in which information is recorded anew.

9 Claims, 21 Drawing Sheets

FIG. 19

|  | TRACK SHIFT AMOUNT (μm) | NUMBER OF TRACKS | NECESSARY NUMBER OF GUARD TRACKS |
|---|---|---|---|
| layer 1 | 0.09 | 0.24 | 1 |
| layer 2 | 0.17 | 0.47 | 1 |
| layer 3 | 0.26 | 0.71 | 2 |
| layer 4 | 0.35 | 0.94 | 2 |
| layer 5 | 0.44 | 1.18 | 3 |
| layer 6 | 0.52 | 1.42 | 3 |
| layer 7 | 0.61 | 1.65 | 4 |
| layer 8 | 0.70 | 1.89 | 4 |
| layer 9 | 0.79 | 2.12 | 5 |
| layer 10 | 0.87 | 2.36 | 5 |
| layer 11 | 0.96 | 2.59 | 6 |
| layer 12 | 1.05 | 2.83 | 6 |
| layer 13 | 1.13 | 3.07 | 7 |
| layer 14 | 1.22 | 3.30 | 7 |
| layer 15 | 1.31 | 3.54 | 8 |
| layer 16 | 1.40 | 3.77 | 8 |
| layer 17 | 1.48 | 4.01 | 9 |
| layer 18 | 1.57 | 4.25 | 9 |
| layer 19 | 1.66 | 4.48 | 9 |
| layer 20 | 1.75 | 4.72 | 10 |

FIG. 24

| | TRACK SHIFT AMOUNT (μm) | NUMBER OF TRACKS | NECESSARY NUMBER OF GUARD TRACKS |
|---|---|---|---|
| layer 1 | 0.09 | 0.27 | 1 |
| layer 2 | 0.17 | 0.55 | 2 |
| layer 3 | 0.26 | 0.82 | 2 |
| layer 4 | 0.35 | 1.09 | 3 |
| layer 5 | 0.44 | 1.36 | 3 |
| layer 6 | 0.52 | 1.64 | 4 |
| layer 7 | 0.61 | 1.91 | 4 |
| layer 8 | 0.70 | 2.18 | 5 |
| layer 9 | 0.79 | 2.45 | 5 |
| layer 10 | 0.87 | 2.73 | 6 |
| layer 11 | 0.96 | 3.00 | 6 |
| layer 12 | 1.05 | 3.27 | 7 |
| layer 13 | 1.13 | 3.55 | 8 |
| layer 14 | 1.22 | 3.82 | 8 |
| layer 15 | 1.31 | 4.09 | 9 |
| layer 16 | 1.40 | 4.36 | 9 |
| layer 17 | 1.48 | 4.64 | 10 |
| layer 18 | 1.57 | 4.91 | 10 |
| layer 19 | 1.66 | 5.18 | 11 |
| layer 20 | 1.75 | 5.45 | 11 |

OPTICAL DISC DEVICE AND OPTICAL INFORMATION RECORDING METHOD

CROSS-REFERENCES TO RELATED APPLICATIONS

The present invention contains subject matter related to Japanese Patent Application JP 2007-314766 filed in the Japanese Patent Office on Dec. 5, 2007, the entire contents of which being incorporated herein by reference.

BACKGROUND OF THE INVENTION

1. Field of the Invention

The present invention relates to an optical disc device and an optical information recording method and is suitably applied to, for example, an optical disc device that records information on a recording medium using a light beam.

2. Description of the Related Art

An optical disc device that uses an optical disc as an information recording medium is wide spread. In general, as the optical disc, a CD (Compact Disc), a DVD (Digital Versatile Disc), a Blu-ray Disc (registered trademark; hereinafter referred to as BD), and the like are used.

Among such optical discs, there is a multilayer disc DC having plural signal recording layers SR that reflect a light beam at predetermined reflectance as shown in FIG. 1A. An optical disc device corresponding to such a multilayer disc DC reads out address information recorded in the signal recording layers SR in advance to thereby irradiate a light beam Lm on a desired track on which the light beam Lm should be irradiated in the signal recording layer SR.

In general, an optical disc device records, on an optical disc, various contents such as music content and video content or various kinds of information such as various data for a computer. In particular, in recent years, since an amount of information increases because of high definition of videos and high sound quality of music and an increase in the number of contents recorded on one optical disc is requested, there is a demand for a further increase in capacity of the optical disc.

In the multilayer disc DC described above, it is possible to increase a storage capacity thereof by increasing the number of signal recording layers SR. However, in this optical disc DC, it is necessary to multilayer the signal recording layers SR by sequentially stacking intermediate layers SM present among the signal recording layers SR. There is a limit in the increase in capacity in terms of manufacturing when it is taken into account that yields in the respective layers are integrated.

Therefore, as one method of increasing a capacity of the optical disc, there is proposed an optical disc device that forms plural recording marks RM in a thickness direction in a uniformly-formed recording layer 101 to record information as shown in FIG. 1B (see, for example, JP-A-2007-220206 (FIGS. 1, 4, and 5)).

In an optical disc 100 corresponding the optical disc device having such a configuration, it is assumed that recording marks are formed on imaginary tracks TR in the recording layer 101 as shown in FIG. 2A. However, since the recording layer 101 is uniform, there is nothing that can mark positions in the recording layer 101. In the following explanation, for convenience of explanation, it is assumed that the plural imaginary tracks TR present in the thickness direction are connected in a cylindrical shape as shown in FIG. 2B.

Therefore, in the optical disc 100, as shown in FIGS. 1B and 2A, a servo layer SS in which tracks are formed is separately provided. The recording marks RM are formed in desired places in the recording layer 101 with the servo layer SS set as a reference position in the thickness direction in the optical disc 100.

The optical disc device focuses, for example, a red light beam Lr having the wavelength of 660 [nm] on the servo layer SS and focuses a predetermined blue light beam Lb having the wavelength of 405 [nm] on a position shifted from a focus Fr of the red light beam Lr by predetermined depth d. Consequently, the optical disc device irradiates the blue light beam Lb on a target mark position present at the predetermined depth d from the servo layer SS in which the focus Fr of the red light beam Lr is located.

SUMMARY OF THE INVENTION

However, the optical disc device having such a configuration is devised on condition that an optical axis Pb of the blue light beam Lb is perpendicularly made incident on the servo layer SS. Therefore, for example, as shown in FIG. 3, when the optical disc 100 inclines and the optical axis Pb of the blue light beam Lb is not perpendicular to the servo layer SS (i.e., a tilt occurs), the optical disc device irradiates the blue light beam Lb on a position shifted from the imaginary track TR.

In this case, the optical disc device forms a recording track RR, on which recording marks are actually formed, in a position shifted from the imaginary track TR.

For example, when recording of information on the optical disc 100 is suspended, if the optical disc 100 is once removed from the optical disc device and inserted again or the optical disc 100 is inserted in another optical disc device, a state of occurrence of a tilt in the optical disc 100 changes.

For example, as shown in FIGS. 4A and 4B, when tilts occur in different directions, the recording track RR on the outer circumferential side on which new information should be written overlaps the recording track RR on the inner circumferential side on which information is already written. The new information is redundantly written over the already-written information, i.e., so-called overwrite occurs.

Therefore, it is desirable to propose an optical disc device and an optical information recording method that can prevent overwrite.

According to an embodiment of the present invention, there is provided an optical disc device that irradiates a light beam on an optical disc having a recording layer in which information is recorded and a positioning layer in which tracks for specifying a recording position of the information in the recording layer are provided, the optical disc device including: an information recording unit that irradiates a light beam for information on a target position in the recording layer to record the information by shifting, while focusing a predetermined light beam for positioning on a desired track of the positioning layer, a position in an optical axis direction of the light beam for information, which shares an optical axis with the light beam for positioning, from the positioning layer; a terminal-end recognizing unit that recognizes, when new information is recorded in a recording layer having a recorded area in which information is already recorded, a terminal end of the recorded area; and a target-position setting unit that sets the target position to separate, by an arbitrary number of guard tracks, the terminal end of the recorded area and a start end of a recording planned area in which information is recorded anew.

This makes it possible to absorb, with an area formed between the recorded area and the recording planned area, a shift that occurs between the target position and the recorded area and a shift that occurs between the target position and the recording planned area and prevent the recorded area and the recording planned area from overlapping.

According to another embodiment of the present invention, there is provided an optical information recording method for irradiating, on an optical disc having a recording layer in which information is recorded and a positioning layer in which tracks for specifying a recording position of the information in the recording layer are provided, a light beam for information on a target position in the recording layer to record the information by shifting, while focusing a predetermined light beam for positioning on a desired track of the positioning layer, a position in an optical axis direction of the light beam for information, which shares an optical axis with the light beam for positioning, from the positioning layer, the optical information recording method including the steps of: recognizing, when new information is recorded in a recording layer having a recorded area in which information is already recorded, a terminal end of the recorded area; and setting the target position to separate, by an arbitrary number of guard tracks, the terminal end of the recorded area and a start end of a recording planned area in which information is recorded anew.

This makes it possible to absorb, with an area formed between the recorded area and the recording planned area, a shift that occurs between the target position and the recorded area and a shift that occurs between the target position and the recording planned area and prevent the recorded area and the recording planned area from overlapping.

According to the embodiments of the present invention, it is possible to absorb, with an area formed between the recorded area and the recording planned area, a shift that occurs between the target position and the recorded area and a shift that occurs between the target position and the recording planned area and prevent the recorded area and the recording planned area from overlapping. Consequently, it is possible to realize an optical disc device and an optical information recording method that can prevent overwrite.

BRIEF DESCRIPTION OF THE DRAWINGS

FIG. 19 is a schematic diagram showing the track shift amount and the necessary number of guard tracks;

FIG. 24 is a schematic diagram showing a track shift amount and a necessary number of guard tracks according to the other embodiment.

DESCRIPTION OF THE PREFERRED EMBODIMENTS

Embodiments of the present invention are explained in detail below with reference to the accompanying drawings.

(1) Configuration of an Optical Disc (1-1) Layer Structure of the Optical Disc

Figure 1A:
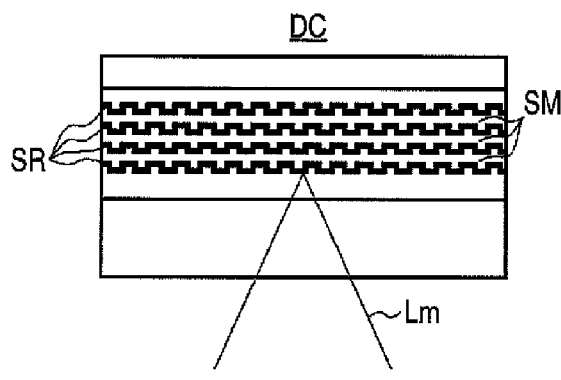
FIGS. 1A and 1B are schematic diagrams showing a form of a multilayer optical disc.
Figure 1B:
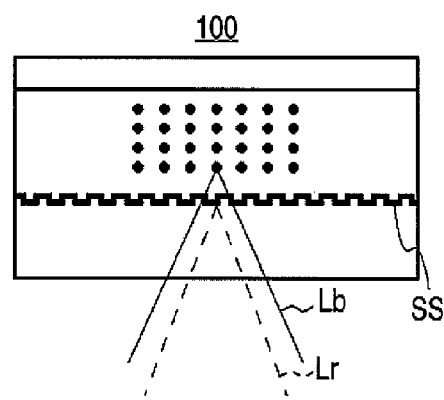
Figure 2A:
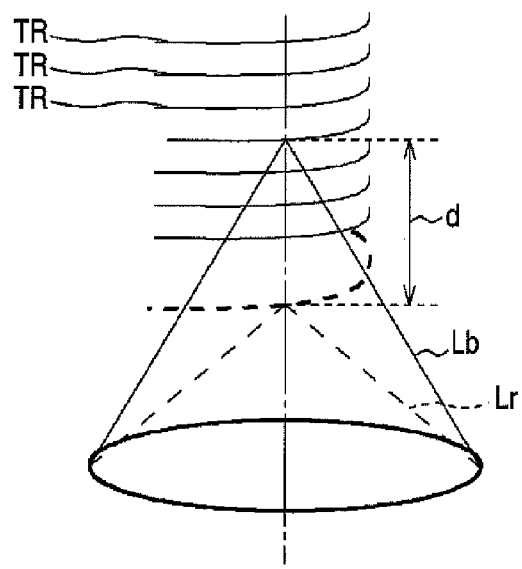
FIGS. 2A and 2B are schematic diagrams for explaining a principle of reference servo.
Figure 2B:
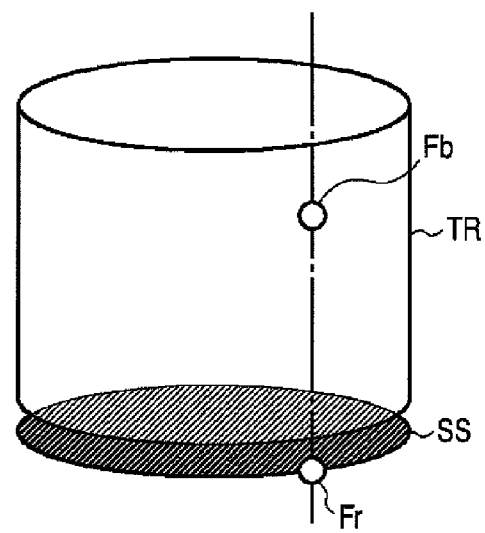
Figure 3:
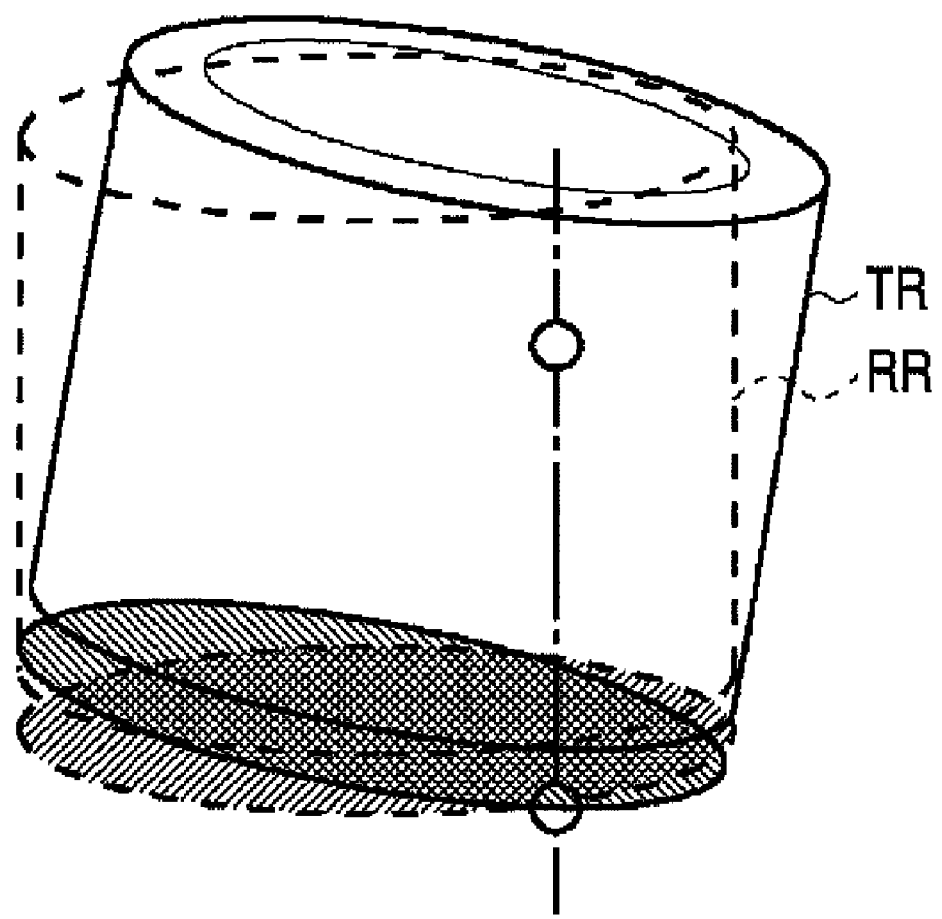
FIG. 3 is a schematic diagram for explaining a shift of a recording position due to occurrence of a tilt.
Figure 4A:
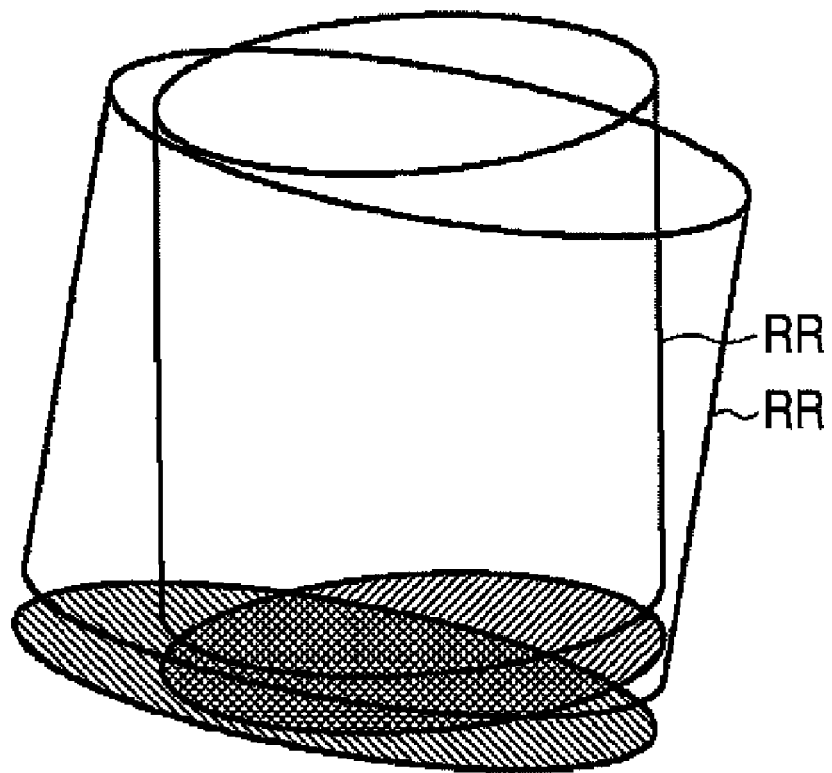
FIGS. 4A and 4B are schematic diagrams for explaining overwrite due to occurrence of a tilt.
Figure 4B:
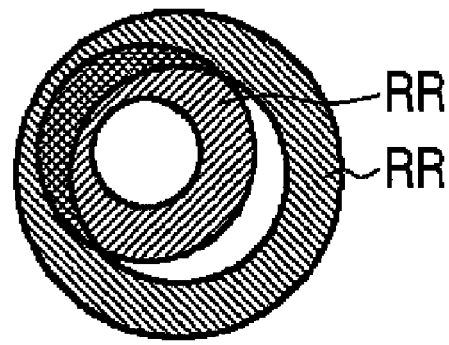
Figure 5:
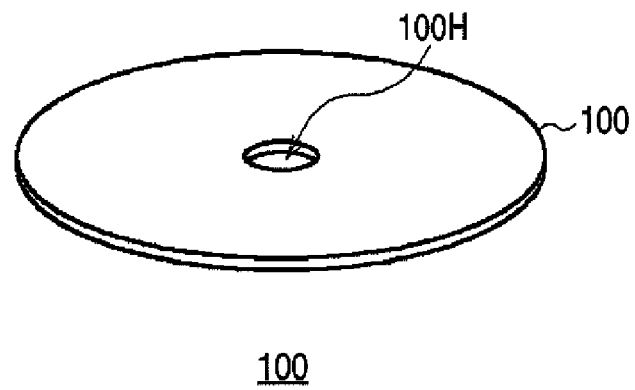
FIG. 5 is a schematic diagram showing an external appearance of an optical disc.

First, an optical disc 100 used as an optical information recording medium in the embodiments of the present invention is explained. As shown in an external view of FIG. 5, the optical disc 100 is generally formed in a disc shape having a diameter of about 120 [mm] in the same manner as the CD, the DVD, and the BD. A hole 100H is formed in the center thereof.

Figure 6:
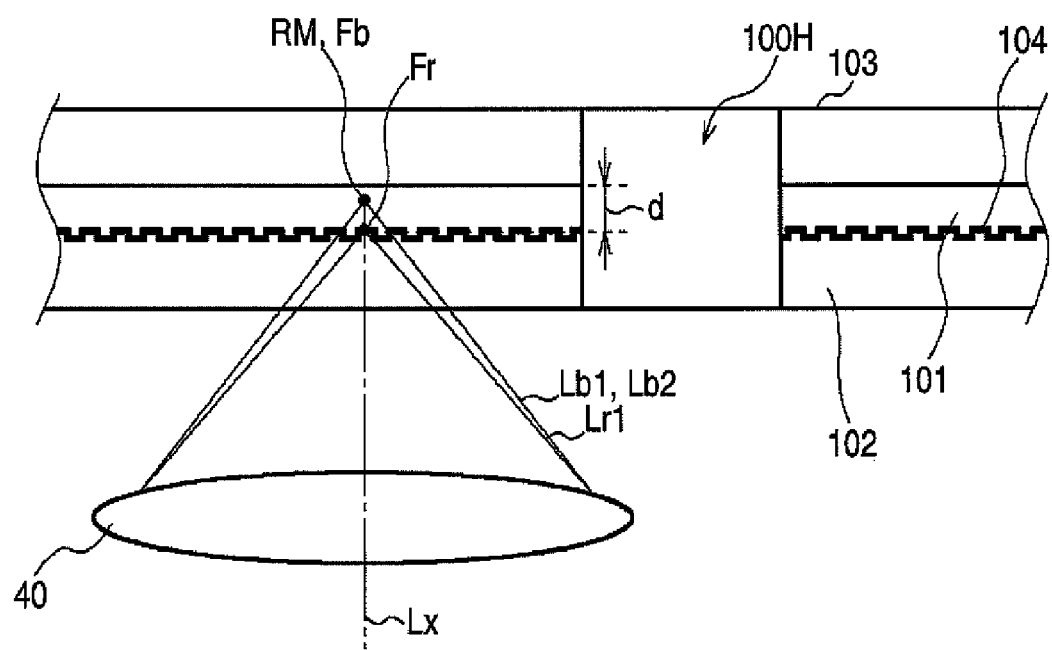
FIG. 6 is a schematic diagram showing a configuration of the optical disc.

As shown in a sectional view of FIG. 6, the optical disc 100 has a recording layer 101 for recording information in the center in a thickness direction thereof. The recording layer 101 is sandwiched from both sides by substrates 102 and 103.

The thickness t1 of the recording layer 101 is set to about 0.5 [mm] and both the thickness t2 and the thickness t3 of the substrates 102 and 103 are set to about 0.6 [mm].

The substrates 102 and 103 are formed of a material such as polycarbonate or glass. Both the substrates 102 and 103 transmit light, which is made incident from one sides thereof, to the other sides thereof at high transmittance. The substrates 102 and 103 have a certain degree of strength and carry out a role of protecting the recording layer 101 as well. The surfaces of the substrates 102 and 103 may be formed to prevent unnecessary reflection by non-reflection coating.

The optical disc 100 has a servo layer 104 serving as a reflection layer in an interface between the recording layer 101 and the substrate 103. The servo layer 104 is formed of a dielectric multilayer film or the like. The servo layer 104 transmits a blue light beam Lb1 formed of a blue laser beam having the wavelength of 405 [nm] and, on the other hand, reflects a red light beam Lr1 formed of a red laser beam having the wavelength of 660 [nm].

In the servo layer 104, guide grooves for tracking servo are formed. Specifically, like the general DVD-R (Recordable) and the like, spiral tracks are formed by lands and grooves. A track pitch of the track is 0.74 [μm]. An address of a serial number is given to the track for each predetermined recording unit to allow a user to specify, using the address, a track in which information is recorded or from which information is reproduced.

In the servo layer 104 (i.e., the interface between the recording layer 101 and the substrate 103), pits or the like may be formed instead of the guide grooves. Alternatively, the guide grooves and the pits or the like may be combined.

When the red light beam Lr1 is irradiated from the substrate 102 side, the servo layer 104 reflects the red light beam Lr1 to the substrate 102 side. A light beam reflected at this point is referred to as red light beam Lr2.

It is assumed that the red light beam Lr2 is used for position control (i.e., focus control and tracking control) for a predetermined object lens 40, for example, in an optical disc device, in order to set a focus Fr of the red light beam Lr1 condensed by the object lens 40 on a track set as a target (hereinafter referred to as target track).

Practically, when information is recorded on the optical disc 100, as shown in FIG. 6, the red light beam Lr1 is condensed by the object lens 40 subjected to the position control and is focused on the target track of the servo layer 104.

A blue light beam Lb1 that shares an optical axis Lx with the red light beam Lr1 and is condensed by the object lens 40 is transmitted through the substrate 102 and focused on a position in the recording layer 101 corresponding to the target track. At this point, a focus Fb of the blue light beam Lb1 is located farther than the focus Fr on the common optical axis Lx, i.e., on an "inner side" relatively to the object lens 40.

When the blue light beam Lb1 is a blue light beam for recoding Lb1w used during recording processing, a recording mark RM is formed in the recording layer 101 by changing a refractive index of a portion where the blue light beam for recording Lb1w is condensed and has predetermined or stronger intensity (i.e., a portion around the focus Fb).

In the optical disc 100, in the same manner as so-called land groove recording, the red light beam Lr1 is focused on both the lands and the grooves of the servo layer 104 to perform tracking control. Consequently, in the optical disc 100, the recording mark RM is formed in the recording layer 101 at a track pitch of 0.37 [μm] that is half a track pitch (0.74 [μm]) of the servo layer 104.

Figure 7A:
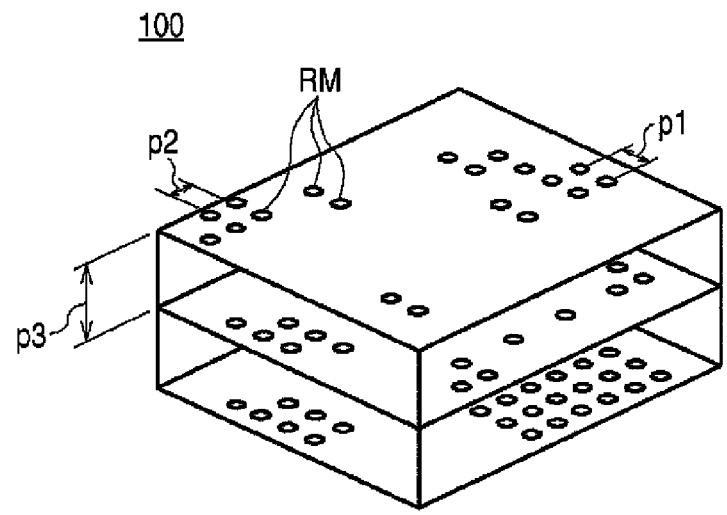
FIGS. 7A and 7B are schematic diagrams for explaining formation of recording marks.
Figure 7B:
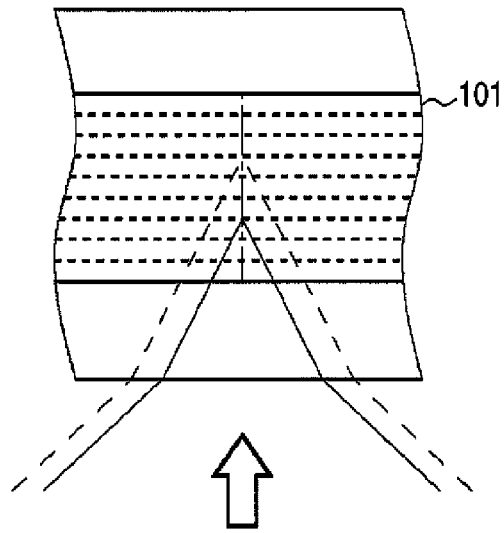

The optical disc 100 is designed such that the thickness t1 (=0.5 [mm]) of the recording layer 101 is sufficiently larger than the height RMh of the recording mark RM. Therefore, in the optical disc 100, the recording mark RM is recorded while a distance d from the servo layer 104 (hereinafter referred to as depth) in the recording layer 101 is switched. Consequently, as shown in FIGS. 7A and 7B, it is possible to perform multilayer recording in which plural mark recording layers are stacked in the thickness direction of the optical disc 100.

In this case, in the recording layer 101 of the optical disc 100, since the depth of the focus Fb of the blue light beam for recording Lb1w is adjusted, the depth of the recording marks RM is changed. For example, in the optical disc 100, if a distance p3 between mark recording layers is set to about 25 [μm] taking into account mutual interference and the like among recording marks RM as shown in FIG. 7A, it is possible to form about twenty mark recording layers in the recording layer 101. The distance p3 may be set to, other than about 25 [μm], various values taking into account the mutual interference and the like among the recording marks RM.

On the other hand, in the optical disc 100, when information is reproduced, as in the recording of the information, the object lens 40 is subjected to position control such that the red light beam Lr1 condensed by the object lens 40 is focused on a target track of the servo layer 104.

Moreover, in the optical disc 100, the focus Fb of a blue light beam for readout Lb1r condensed via the identical object lens 40 is focused on a target position that corresponds to an "inner side" of the target track in the recording layer 101 and is set as the target depth (hereinafter referred to as target mark position).

At this point, in the recording mark RM recorded in the position of the focus Fb, the blue light beam Lb1r is reflected according to a difference in a refractive index from the recording marks RM around the recording mark RM and a blue light beam Lb2 is generated from the recording mark RM recorded in the target mark position.

In this way, in the optical disc 100, when information is recorded, since the red light beam Lr1 for position control and the blue light beam for recording Lb1w are used, the recording mark RM is formed as the information in the position where the focus Fb is irradiated in the recording layer 101, i.e., the target mark position that is on the inner side of the target track in the servo layer 104 and set as the target depth.

In the optical disc 100, when recorded information is reproduced, since the red light beam Lr1 for position control and the blue light beam for readout Lb1r are used, the blue light beam Lb2 is generated from the recording mark RM recorded in the position of the focus Fb, i.e., the target mark position.

(1-2) Configuration of an Optical Disc Device

Figure 8:
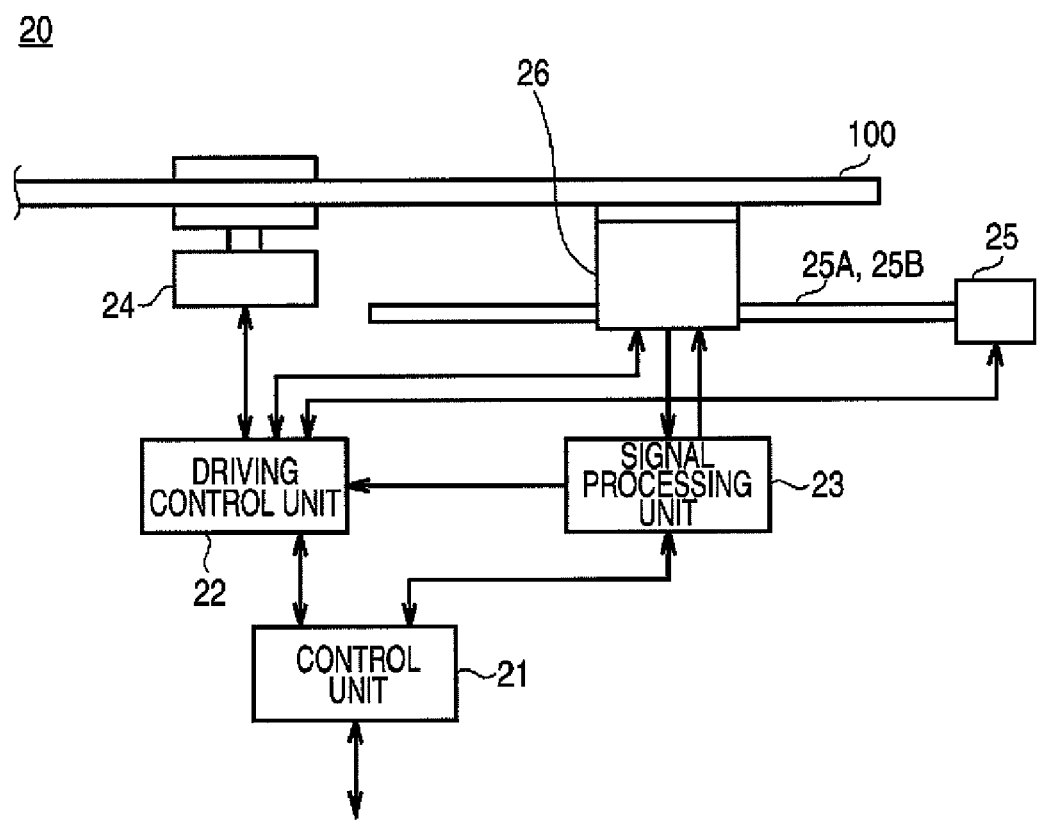
FIG. 8 is a schematic diagram showing a configuration of an optical disc device.

An optical disc device 20 corresponding to the optical disc 100 is explained. As shown in FIG. 8, the optical disc device 20 is collectively controlled by a control unit 21.

The control unit 21 mainly includes a not-shown CPU (Central Processing Unit). The control unit 21 reads out various programs such as a basic program and an information recording program from a not-shown ROM (Read Only Memory) and expands the programs in a not-shown RAM (Random Access Memory) to thereby execute various kinds of processing such as information reproduction processing and information recording processing.

For example, when an information reproduction command and reproduction address information indicating an address of recorded information is received from, for example, an external apparatus (not shown), the control unit 21 starts the information reproduction processing, supplies a driving command to a driving control unit 22, and supplies a reproduction processing command to a signal processing unit 23.

The driving control unit 22 controls to drive, according to the driving command, a spindle motor 24 to thereby rotate the optical disc 100 at predetermined rotation speed and controls to drive a thread motor 25 to thereby move an optical pickup 26 to a position corresponding to reproduction address information in a radial direction (i.e., the inner circumferential direction or the outer circumferential direction) of the optical disc 100 along moving shafts 25A and 25B.

The optical pickup 26 performs focus control and tracking control on the basis of the control by the driving control unit 22 (FIG. 8) to thereby adjust an irradiation position of the blue light beam for readout Lb1r to a track indicated by reproduction address information (i.e., a target track) in the recording layer 101 of the optical disc 100 and irradiates a light beam of a predetermined light amount on a target mark position. At this point, the optical pickup 26 detects the blue light beam Lb2 generated from the recording marks RM in the recording layer 101 in the optical disc 100 and supplies a detection signal corresponding to a light amount of the blue light beam Lb2 to the signal processing unit 23.

The signal processing unit 23 applies various kinds of signal processing such as predetermine demodulation processing and decoding processing to the supplied detection signal to thereby generate reproduction information and supplies the reproduction information to the control unit 21. In response to the supply of the reproduction information, the control unit 21 sends the reproduction information to the external apparatus (not shown).

When a reproduction finishing command to the effect that the information reproduction processing should be finished is received from the external apparatus, the control unit 21 finishes the information reproduction processing.

In a state in which the optical disc 100 is inserted, when an information recording command and recording information are received from the not-shown external apparatus or the like, the control unit 21 starts information recording processing. The control unit 21 reads out terminal end address information indicating a terminal end of tracks in which recording marks are already formed (hereinafter referred to as recorded tracks) RRz from an innermost circumferential area in the recording layer 101 and temporarily stores the terminal end address information in the RAM.

Moreover, the control unit 21 generates recording address information on the basis of the terminal end address information (the generation of the recording address information is described in detail later), supplies the recording address information to the driving control unit 22, and supplies the recording information to the signal processing unit 23. The recording address information is information indicating an address representing a start end (i.e., a target mark position where writing is started) of tracks RRa in which the recording information should be recorded (hereinafter referred to as recording planned track), among addresses given to the recording layer 101 of the optical disc 100.

As in the recording of information, the driving control unit 22 controls to drive the spindle motor 24 to thereby rotate the optical disc 100 at the predetermined rotation speed and controls to drive the thread motor 25 to thereby move the optical pickup 26 to a position corresponding to the reproduction address information.

The signal processing unit 23 applies various kinds of signal processing such as predetermined encoding processing and modulation processing to the supplied recording information to thereby generate a recording signal and supplies the recording signal to the optical pickup 26.

The optical pickup 26 performs focus control and tracking control on the basis of the control by the driving control unit 22 (FIG. 8) to thereby adjust an irradiation position of the blue light beam for recording Lb1w to a track indicated by the recording address information in the recording layer 101 of the optical disc 100. The optical pickup 26 records the recording mark RM corresponding to the recording signal from the signal processing unit 23 in the target mark position.

When a recording finishing command to the effect that the information recording processing should be finished is received from the external apparatus, the control unit 21 records the terminal end address information in the innermost circumferential area in the mark recording layer of the recording layer 101 and finishes the information recording processing.

In this way, the optical disc device 20 controls the optical pickup 26 with the control unit 21 to thereby record information in the target mark position in the recording layer 101 of the optical disc 100 and reproduces the information from the target mark position.

(1-3) Configuration of the Optical Pickup

Figure 9:
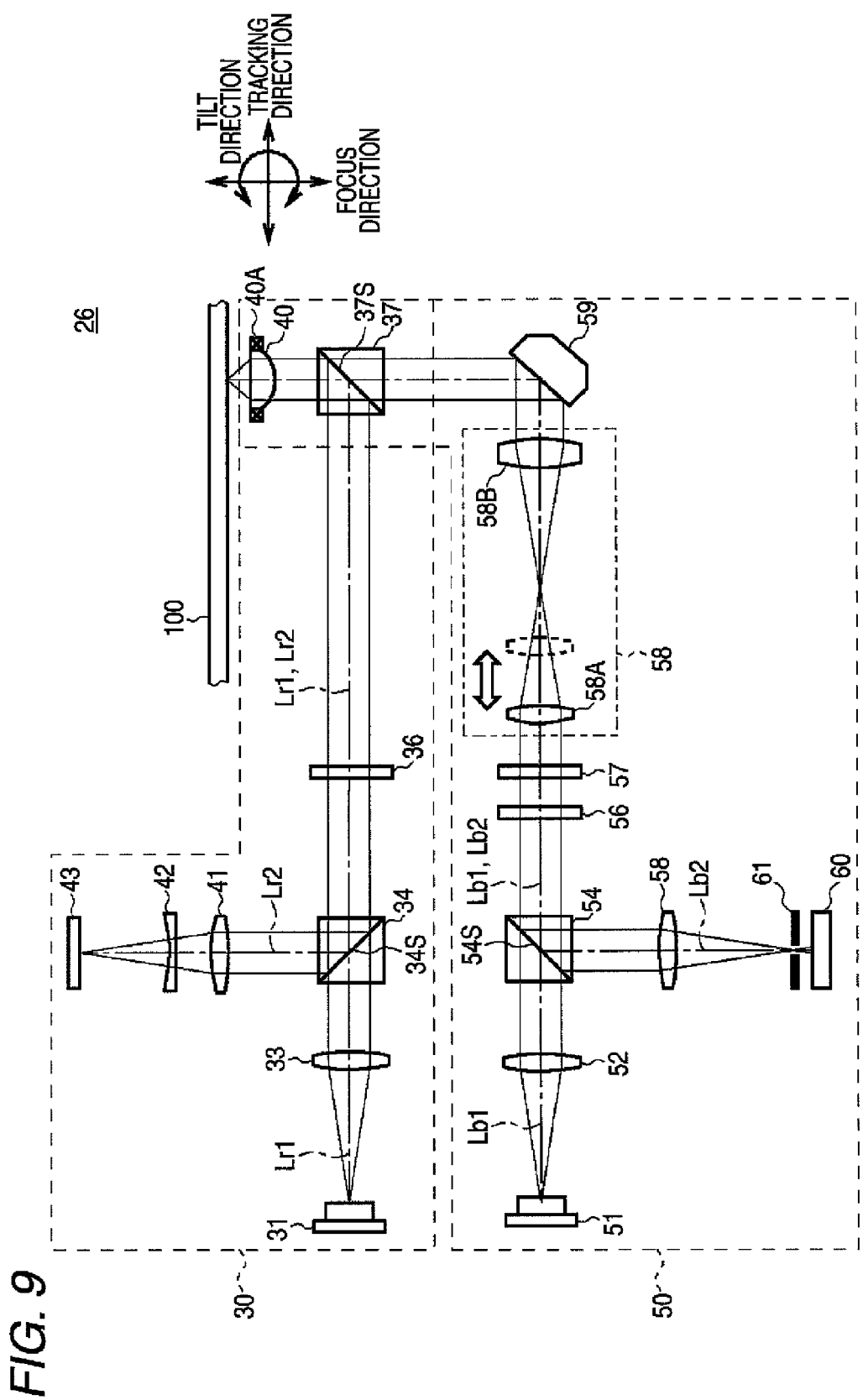
FIG. 9 is a schematic diagram showing a configuration of an optical pickup.

A configuration of the optical pickup 26 is explained. The optical pickup 26 includes, as shown in FIG. 9, a servo optical system 30 for servo control and an information optical system 50 for reproduction and recording of information.

The optical pickup 26 makes the red light beam Lr1 as servo light emitted from a laser diode 31 and the blue light beam Lb1 (the blue light beam for readout Lb1r and the blue light beam for recording Lb1w) emitted from the laser diode 51 incident on the identical object lens 40 via the servo optical system 30 and the information optical system 50, respectively. The optical pickup 26 irradiates the red light beam Lr1 and the blue light beam Lb1 on the optical disc 100.

(1-3-1) Optical Path for the Red Light Beam

Figure 10:
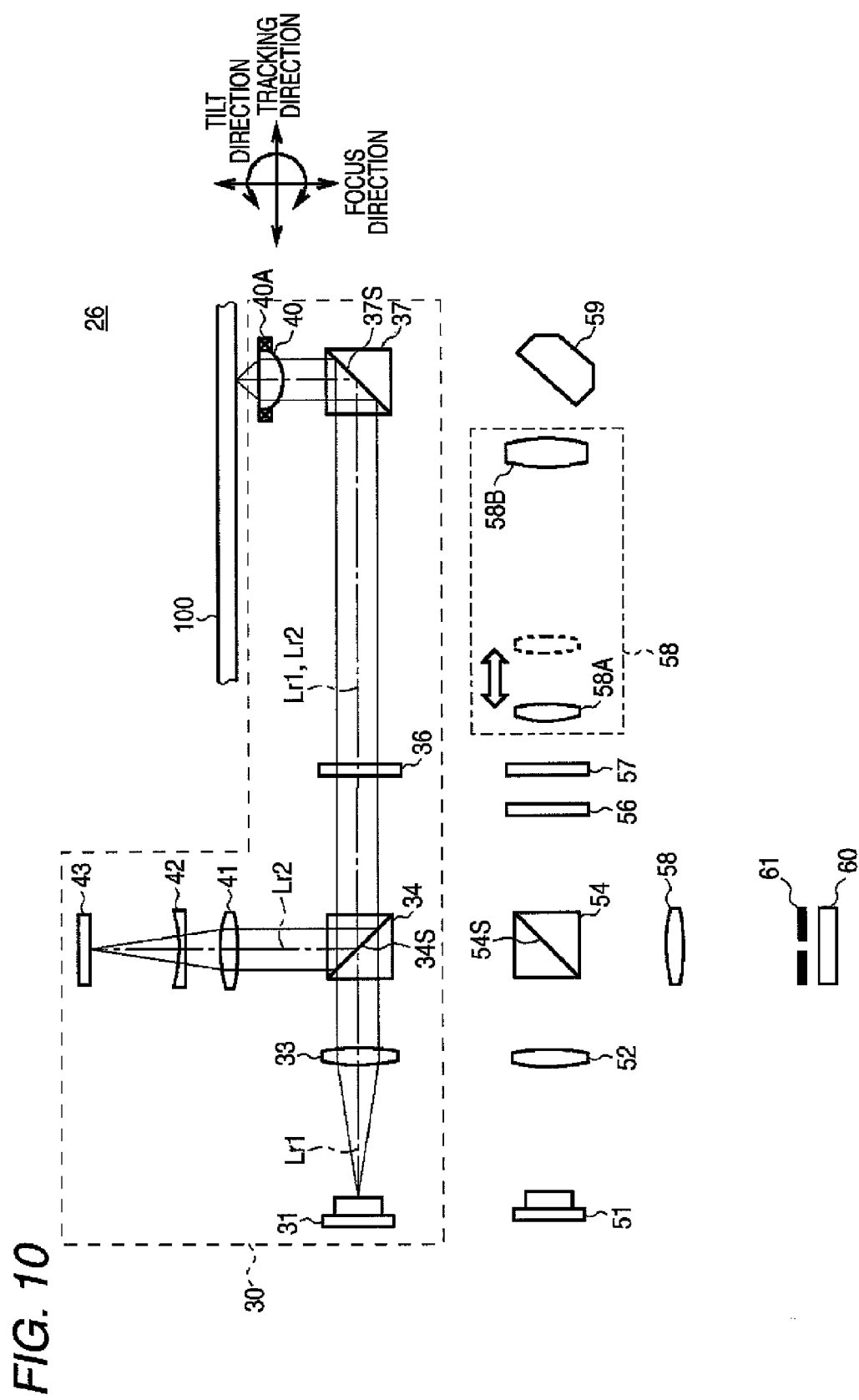
FIG. 10 is a schematic diagram for explaining an optical path for a red light beam.

As shown in FIG. 10, the servo optical system 30 irradiates the red light beam Lr1 on the optical disc 100 via the object lens 40 and receives the red light beam Lr2 reflected by the optical disc 100 with a photodetector 43.

The laser diode 31 emits the red light beam Lr1 of a predetermined light amount formed of diverging rays on the basis of the control by the control unit 21 (FIG. 8) and makes the red light beam Lr1 incident on a collimator lens 33. The collimator lens 33 converts the red light beam Lr1 from the diverging rays to parallel rays and makes the red light beam Lr1 incident on a polarization beam splitter 34.

The polarization beam splitter 34 transmits substantially the entire light beam of P polarized light and reflects substantially the entire light beam of S polarized light with a reflection and transmission surface 34S. The polarization beam splitter 34 transmits substantially the entire red light beam Lr1 formed of P polarized light and makes the red light beam Lr1 incident on a quarter-wave plate 36.

The quarter-wave plate 36 converts the red light beam Lr1 formed of P polarized light into, for example, left circularly polarized light and makes the red light beam Lr1 incident on a dichroic prism 37. The dichroic prism 37 reflects or transmits a light beam according to the wavelength of the light beam with a reflection and transmission surface 37S. Therefore, the dichroic prism 37 reflects the red light beam Lr1 and makes the red light beam Lr1 incident on the object lens 40.

The object lens 40 condenses the red light beam Lr1 and irradiates the red light beam Lr1 to the servo layer 104 of the optical disc 100. At this point, as shown in FIG. 6, the red light beam Lr1 is transmitted through the substrate 102 and reflected on the servo layer 104, travels in a direction opposite to the red light beam Lr1, and changes to the red light beam Lr2 in a polarization direction opposite to that of the red light beam Lr1.

Thereafter, the red light beam Lr2 is converted into parallel rays by the object lens 40 and, then, made incident on the dichroic prism 37. The dichroic prism 37 reflects the red light beam Lr2 and makes the red light beam Lr2 incident on the quarter-wave plate 36.

The quarter-wave plate 36 converts the red light beam Lr2 formed of right circularly polarized light into S polarized light and makes the red light beam Lr2 incident on the polarization beam splitter 34. The polarization beam splitter 34 reflects the red light beam Lr2 formed of the S polarized light and makes the red light beam Lr2 incident on a multi-lens 41.

The multi-lens 41 causes the red light beam Lr2 to converge and, after imparting astigmatism thereto with a cylindrical lens 42, irradiates the red light beam Lr2 on a photodetector 43.

In the optical disc device 20, since wobble and the like in the rotating optical disc 100 are likely to occur, it is likely that a relative position of a target track with respect to the object lens 40 fluctuates.

Therefore, to cause the focus Fr (FIG. 6) of the red light beam Lr1 to follow the target track, it is necessary to move the focus Fr in a focus direction that is a direction approaching or separating from the optical disc 100 and a tracking direction that is the inner circumferential side direction or the outer circumferential side direction of the optical disc 100.

Therefore, the object lens 40 can be driven in two-axis directions, i.e., the focus direction and the tracking direction, by a two-axis actuator 40A.

In the servo optical system 30 (FIG. 10), optical positions of various optical components are adjusted such that a focus state at the time when the led light beam Lr1 is condensed and irradiated on the servo layer 104 of the optical disc 100 by the object lens 40 is reflected on a focus state at the time when the red light beam Lr2 is condensed and irradiated on the photodetector 43 by the multi-lens 41.

The photodetector 43 generates a detection signal corresponding to a light amount of the red light beam Lr2 and transmits the detection signal to the signal processing unit 23 (FIG. 8).

The signal processing unit 23 calculates a focus error signal SFEs representing an amount of shift between the focus Fr of the red light beam Lr1 and the servo layer 104 of the optical disc 100 and a tracking error signal STEr representing an amount of shift between the focus Fr and the target track in the servo layer 104 of the optical disc 100 and supplies the error signals to the driving control unit 22.

The driving control unit 22 generates a focus driving signal SFDr on the basis of the focus error signal SFEs and supplies the focus driving signal SFDr to the two-axis actuator 40A to thereby feedback-control (i.e., focus-control) the object lens 40 such that the red light beam Lr1 is focused on the servo layer 104 of the optical disc 100.

The driving control unit 22 generates a tracking driving signal STDr on the basis of the tracking error signal STEr and supplies the tracking driving signal STDr to the two-axis actuator 40A to thereby feedback-control (i.e., tracking-control) the object lens 40 such that the red light beam Lr1 is focused on the target track in the servo layer 104 of the optical disc 100.

In this way, the servo optical system 30 irradiates the red light beam Lr1 on the servo layer 104 of the optical disc 100 and supplies a light reception result of the red light beam Lr2, which is reflected light of the red light beam Lr1, to the signal processing unit 23. According to the light reception result, the driving control unit 22 performs focus control and tracking control for the object lens 40 to focus the red light beam Lr1 on the target track of the servo layer 104.

(1-3-2) Optical Path for the Blue Light Beam

Figure 11:
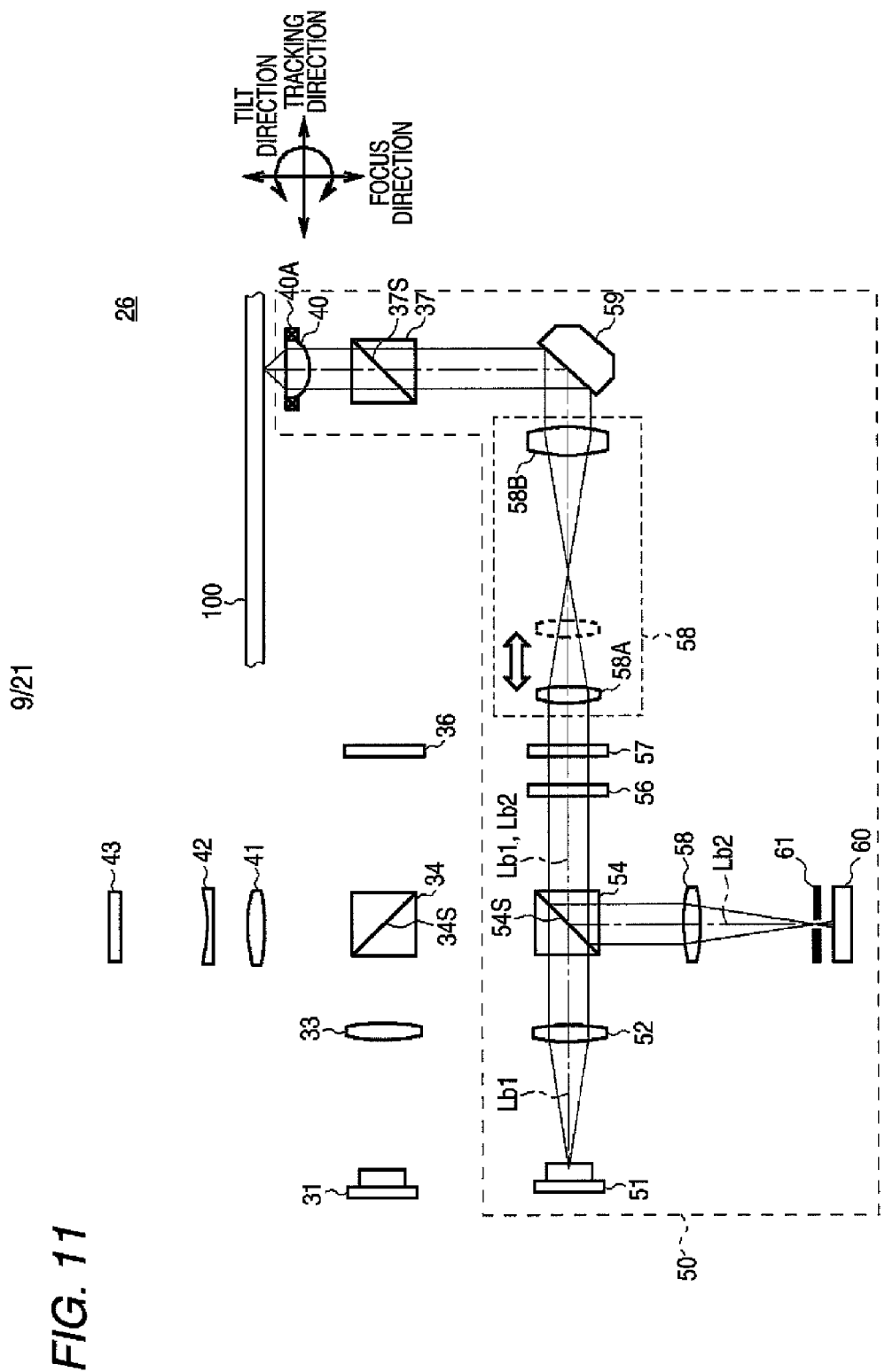
FIG. 11 is a schematic diagram for explaining an optical path for a blue light beam.

On the other hand, as shown in FIG. 11 corresponding to FIG. 9, the information optical system 50 irradiates the blue light beam Lb1 emitted from the laser diode 51 via the object lens 40 on the optical disc 100 and receives the blue light beam Lb2 reflected by the optical disc 100 with a photodetector 60.

The laser diode 51 emits the blue light beam Lb1 of a predetermined light amount formed of diverging rays on the basis of the control by the control unit 21 (FIG. 8) and makes the blue light beam Lb1 incident on a collimator lens 52. The collimator lens 52 converts the blue light beam Lb1 from the diverging rays to parallel rays and makes the blue light beam Lb1 incident on a polarization beam splitter 54.

The polarization beam splitter 54 transmits substantially the entire light beam of P polarized light with a reflection and transmission surface 54S and reflects substantially the entire light beam of S polarized light. The polarization beam splitter 54 transmits the blue light beam Lb1 formed of P polarized light and makes the blue light beam Lb1 incident on a quarter-wave plate 57 via an LCP (Liquid Crystal Panel) 56 that corrects spherical aberration and the like.

The quarter-wave plate 57 converts the blue light beam Lb1 from the P polarized light into, for example, left circularly polarized light and makes the blue light beam Lb1 incident on a relay lens 58.

The relay lens 58 converts the blue light beam Lb1 from the parallel rays into converging rays with a movable lens 58A, converts the blue light beam Lb1, which changes to diverging rays after convergence, into the converging rays again with a fixed lens 58B, and makes the blue light beam Lb1 incident on a mirror 59.

The movable lens 58A is moved in an optical axis direction of the blue light beam Lb1 by a not-shown actuator. Practically, the relay lens 58 can change a converging state of the blue light beam Lb1 emitted from the fixed lens 58B by moving the movable lens 58A with the actuator on the basis of the control by the control unit 21 (FIG. 8).

The mirror 59 reflects the blue light beam Lb1 to thereby reverse a polarization direction of the blue light beam Lb1 formed of circularly polarized light (e.g., from left circularly polarized light to right circularly polarized light) and deflect a traveling direction of the blue light beam Lb1 and makes the blue light beam Lb1 incident on the dichroic prism 37. The dichroic prism 37 transmits the blue light beam Lb1 with a reflection and transmission surface 37S and makes the blue light beam Lb1 incident on the object lens 40.

The object lens 40 condenses the blue light beam Lb1 and irradiates the blue light beam Lb1 on the optical disc 100. At this point, as shown in FIG. 6, the blue light beam Lb1 is transmitted through the substrate 102 and focused in the recording layer 101.

A position of the focus Fb of the blue light beam Lb1 is set according to a converging state of the blue light beam Lb1 at the time when the blue light beam Lb1 is emitted from the fixed lens 58B of the relay lens 58. In other words, the focus Fb moves in the focus direction in the recording layer 101 according to a position of the movable lens 58A.

Specifically, the information optical system 50 is designed such that a moving distance of the movable lens 58A and a moving distance of the focus Fb of the blue light beam Lb1 are substantially in a proportional relation. For example, when the movable lens 58A is moved 1 [mm], the focus Fb of the blue light beam Lb1 moves 30 [μm].

Practically, when a position of the movable lens 58A is controlled by the control unit 21 (FIG. 8), the information optical system 50 adjusts the depth d (i.e., a distance from the servo layer 104) of the focus Fb (FIG. 6) of the blue light beam Lb1 in the recording layer 101 of the optical disc 100 and matches the focus Fb with the target mark position.

In this way, the information optical system 50 irradiates the blue light beam Lb via the object lens 40 servo-controlled by the servo optical system 30 to thereby match the tracking direction of the focus Fb of the blue light beam Lb1 with the target mark position. Further, the information optical system 50 adjusts the depth d of the focus Fb according to a position of the movable lens 58A in the relay lens 58 to thereby match the focus direction of the focus Fb with the target mark position.

In recording processing for recording information on the optical disc 100, the blue light beam Lb1 is condensed on the focus Fb by the object lens 40 and forms the recording mark RM in the focus Fb.

In reproduction processing for reading out the information recorded on the optical disc 100, when the recording mark RM is recorded in the focus Fb, the blue light beam for readout Fb1r of the blue light beam Lb1 condensed in the focus Fb is reflected by the recording mark RM as the blue light beam Lb2 and made incident on the object lens 40. At this point, a polarization direction in circularly polarized light of the blue light beam Lb2 is reversed (e.g., from right circularly polarized light to left circularly polarized light) by the reflection by the recording mark RM.

On the other hand, when the recording mark RM is not recorded in the focus Fb, the blue light beam Lb1 diverges again after converging in the focus Fb, reflected by the servo layer 104, and made incident on the object lens 40 as the blue light beam Lb2. At this point, a rotating direction in circularly polarized light of the blue light beam Lb2 is reversed (e.g., from right circularly polarized light to left circularly polarized light) by the reflection by the servo layer 104.

The object lens 40 causes the blue light beam Lb2 to converse to some extent and makes the blue light beam Lb2 incident on the dichroic prism 37. The dichroic prism 37 transmits the blue light beam Lb2 and makes the blue light beam Lb2 incident on the mirror 59.

The mirror 59 reflects the blue light beam Lb2 to thereby reverse a polarization direction of the blue light beam Lb1 formed of circularly polarized light (e.g., from left circular polarized light to right circular polarized light) and deflect a traveling direction thereof and makes the blue light beam Lb2 incident on the relay lens 58.

The rely lens 58 converts the blue light beam Lb2 into parallel rays and makes the blue light beam Lb2 incident on the quarter-wave plate 57. The quarter-wave plate 57 converts the blue light beam Lb2 formed of circularly polarized light into linear polarized light (e.g., from right circularly polarized light into S polarized light) and makes the blue light beam Lb2 incident on the polarization beam splitter 54 via the LCP 56.

The polarization beam splitter 54 reflects the blue light beam Lb2 formed of S polarized light with a polarization surface (reflection and transmission surface) 54S and makes the blue light beam Lb2 incident on the multi-lens 58. The multi-lens 58 condenses the blue light beam Lb2 and irradiates the blue light beam Lb2 on the photodetector 60 via a pinhole plate 61.

The pinhole plate 61 is arranged to locate the focus of the blue light beam Lb2 condensed by the multi-lens 57 (FIG. 9) in a hole 61H and directly transmits the blue light beam Lb2.

On the other hand, the pinhole plate 61 substantially blocks lights having different focuses (hereinafter referred to as stray lights) reflected from, for example, the surface of the substrate 102 in the optical disc 100, the recording marks RM present in positions different from the target mark position, and the servo layer 104. As a result, the photodetector 60 hardly detects light amounts of the stray lights.

As a result, the photodetector 60 generates a reproduction detection signal SDb corresponding to a light amount of the blue light beam Lb2 without being affected by the stray lights and supplies the reproduction detection signal SDb to the signal processing unit 23 (FIG. 8).

In this case, the reproduction detection signal SDb accurately represents information recorded on the optical disc 100 as the recording marks RM. Therefore, the signal processing unit 23 applies predetermined demodulation processing, decoding processing, and the like to the reproduction detection signal SDb to generate reproduction information and supplies the reproduction information to the control unit 21.

In this way, the information optical system 50 receives the blue light beam Lb2 made incident on the object lens 40 from the optical disc 100 and supplies a result of the light reception to the signal processing unit 23.

(2) Prevention of Overwrite

In the optical disc device 20, as described above, when recording of information on the optical disc 100 is suspended, if the optical disc 100 is once removed from the optical disc device 20 and inserted again or the optical disc 100 is inserted in another optical disc device, it is likely that a state of generation of a tilt in the optical disc 100 changes and overwrite occurs.

Figure 12A:
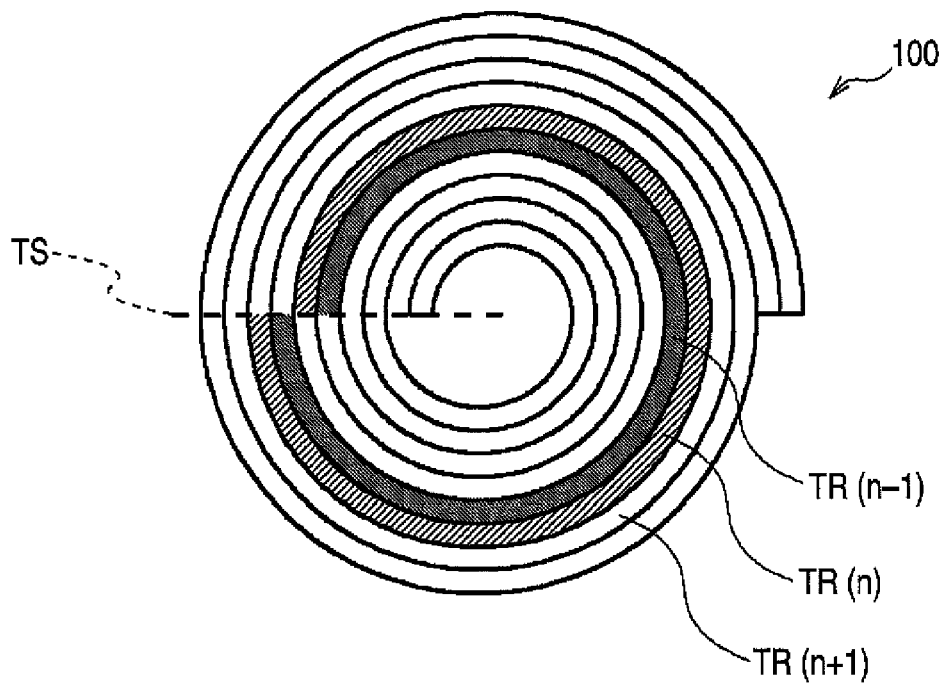
FIGS. 12A and 12B are schematic diagrams for explaining a definition of a track.
Figure 12B:
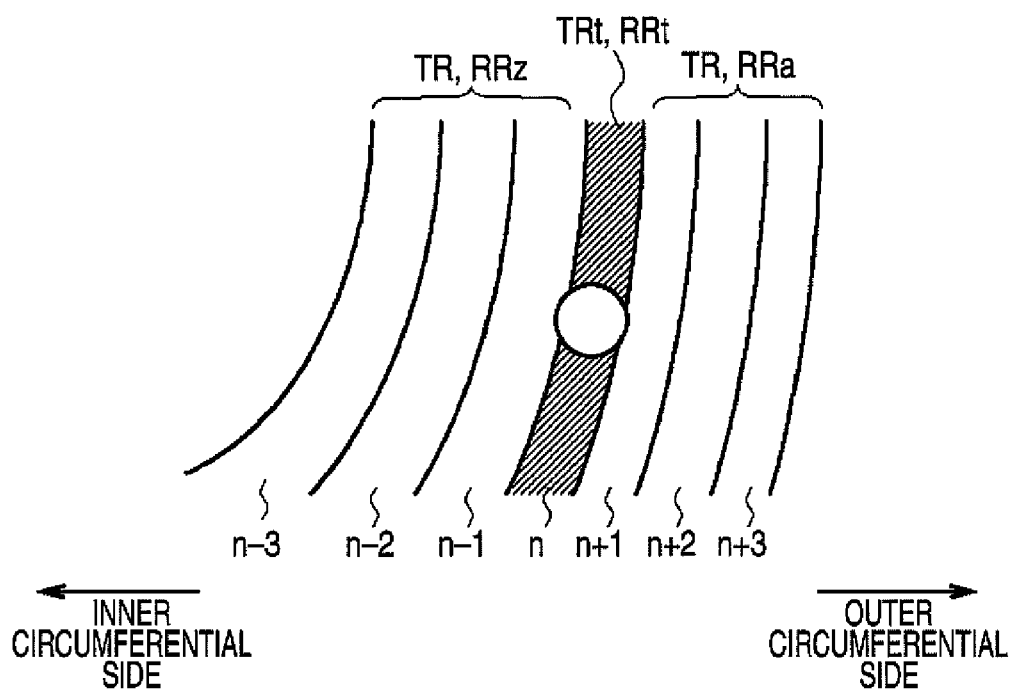

In the respective mark recording layers in the recording layer 101, as shown in FIG. 12A, it is assumed that the recording marks RM are formed on spiral imaginary tracks TR. The optical disc 100 is a so-called write-once type in which the recording marks RM are formed in order from the inner circumferential side to the outer circumferential side. The optical disc device 20 forms the recording marks RM in order from the imaginary tracks TR on the inner circumferential side to the imaginary tracks TR on the outer circumferential side. Since the optical disc device 20 performs land groove recording as described above, the imaginary tracks TR are formed in a double helix shape.

In this case, a round starting from a reference line TS drawn in the radial direction of the optical disc 100 and reaching the reference line TS is set as one imaginary track TR. In other words, it is assumed that the imaginary tracks TR are present in the same number as the number of rounds in each of the mark recording layers in the recording layer 101.

The imaginary track TR in which the target mark position on which the blue light beam Lb1 should be irradiated is present is represented as a target track TRt (n). Tracks present on the inner circumferential side by one track, two tracks, three tracks, and the like relatively to the target track TRt (n) are represented as an imaginary track TR(n−1), an imaginary track TR(n−2), an imaginary track TR(n−3), and the like, respectively.

Similarly, tracks present on the outer circumferential side by one track, two tracks, three tracks, and the like relatively to the target track TRt(n) are represented as an imaginary track TR(n+1), an imaginary track TR(n+2), an imaginary track TR(n+3), and the like.

In each of the mark recording layers, the recording marks RM are formed from the inner circumferential side to the outer circumferential side. Therefore, in tracks in which the recording marks RM are actually recorded (hereinafter referred to as recording tracks RR), the recording marks RM are formed on the inner circumferential side relatively to a track being recorded RRt(n) in which a present target mark position is present (i.e., the recording marks RM are currently being formed). However, the recording marks RM are not formed on the outer circumferential side.

Therefore, concerning the recording tracks RR, tracks present on the inner circumferential side relatively to the track being recorded RRt (n) are represented as recorded tracks RRz. Tracks present on the inner circumferential side by one track, two tracks, three tracks, and the like are represented as a recorded track RRz(n−1), a recorded track RRz(n−2), a recorded track RRz(n−3), and the like, respectively.

Tracks planned to be formed on the outer circumferential side relatively to the track being recorded RRt(n) are represented as recording planned tracks RRa. Tracks present on the outer circumferential side by one track, two tracks, three tracks, and the like are represented as recording planned track RRa (n+1), a recording planned track RRa (n+2), a recording planned track RRa(n+3), and the like, respectively.

Figure 13A:
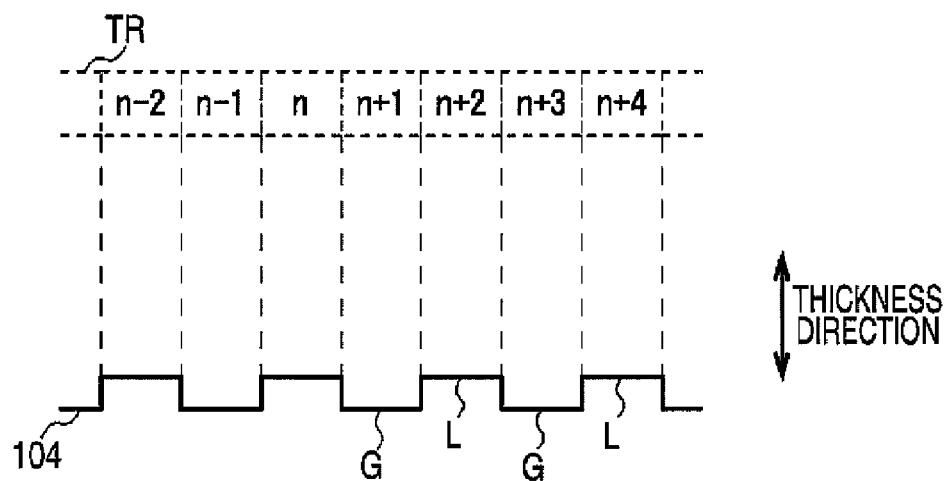
FIGS. 13A and 13B are schematic diagrams for explaining a relation between a servo layer and an imaginary track.

As shown in FIG. 13A, grooves G and lands L are formed in the servo layer 104. It is assumed that the imaginary tracks TR are present, in association with the grooves G and the lands L, in positions to which the grooves G and the lands L are horizontally moved in the thickness direction of the optical disc 100.

Figure 13B:
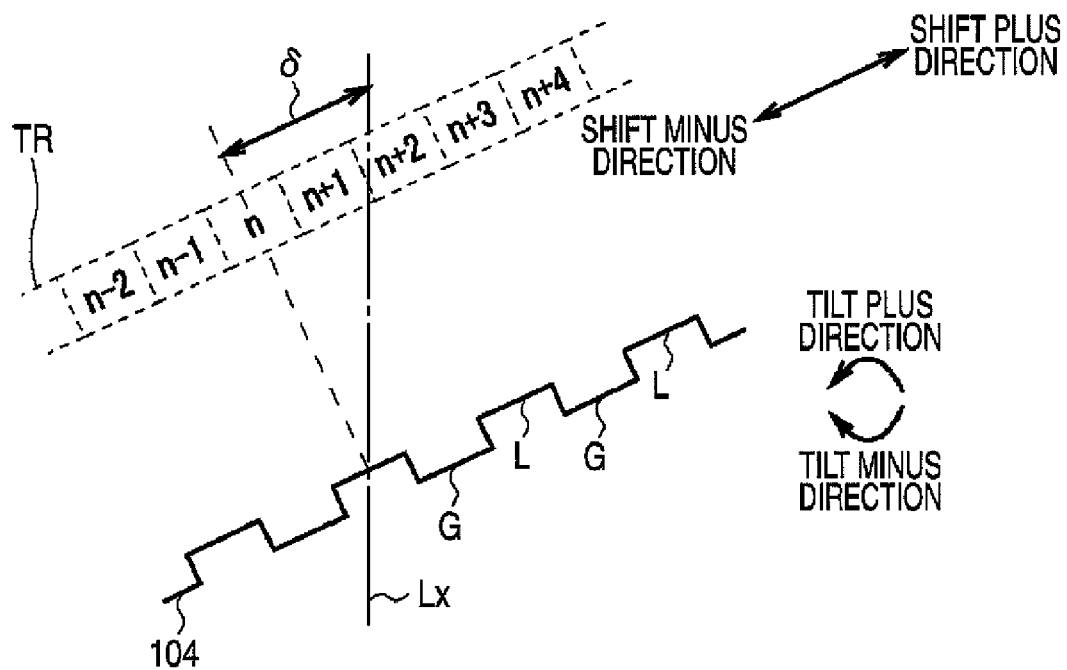

As shown in FIG. 13B, when, for example, a tilt in a tilt plus direction occurs in the optical disc 100, the optical axis Lx of the blue light beam Lb1 inclines with respect to the servo layer 104, whereby the optical axis Lx shifts in a shift plus direction by a track shift amount δ (in the figure, about 1.5 tracks).

Figure 14:
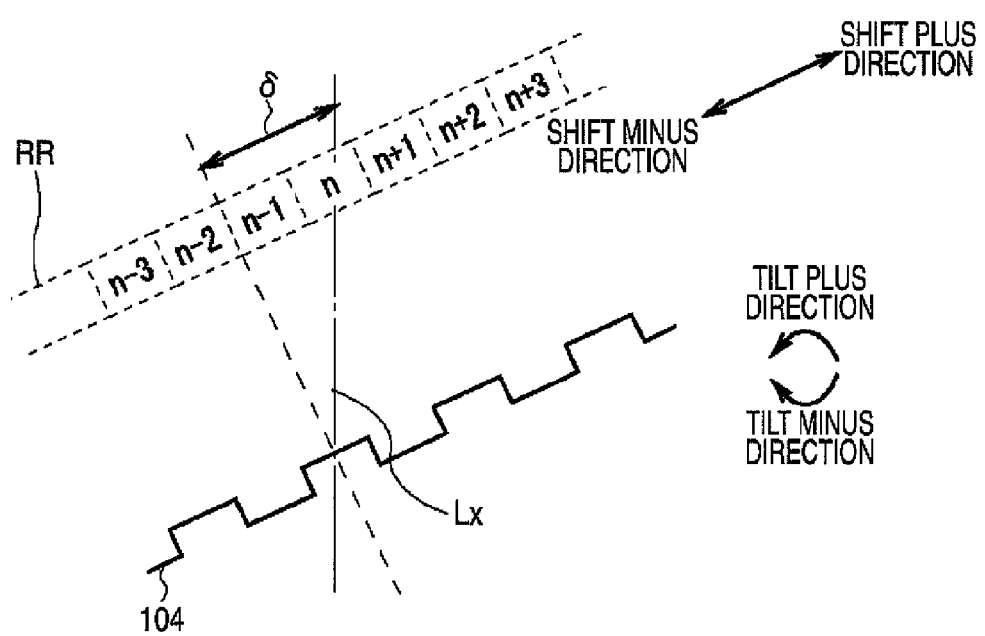
FIG. 14 is a schematic diagram for explaining a relation between the servo layer and a recording track.

As a result, as shown in FIG. 14, the recording tracks RR are formed in positions shifted from the imaginary tracks TR in the shift plus direction by the track shift amount δ.

Although not shown in the figure, the same applies when a tilt in a tilt minus direction occurs in the optical disc 100. The optical axis Lx of the blue light beam Lb1 shifts in a shift minus direction, whereby the recording tracks RR shift in the shift minus direction by the track shift amount δ from the imaginary tracks TR.

Figure 15:
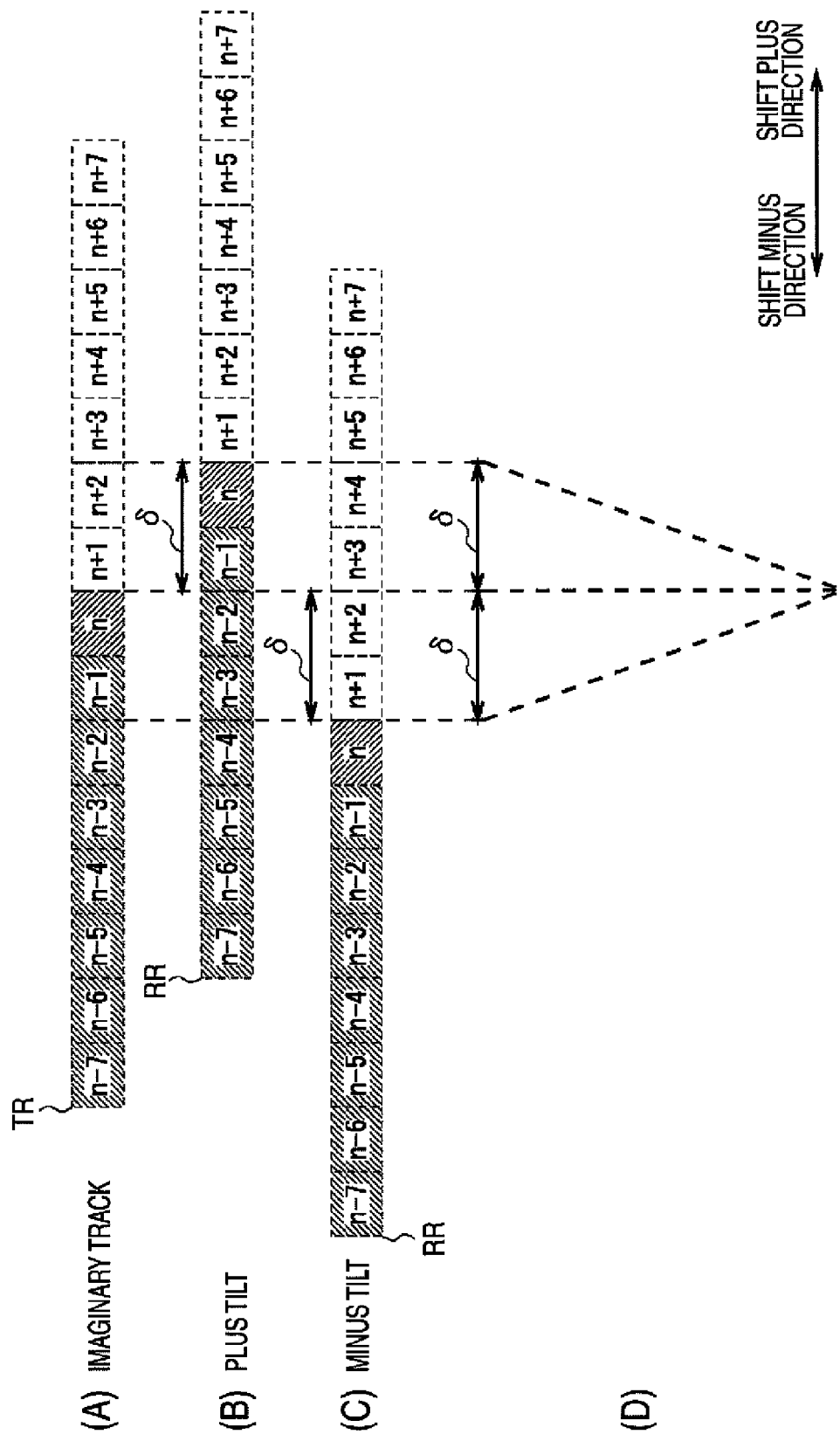
FIG. 15 is a schematic diagram for explaining occurrence of a tilt and a shift of a track.

A positional relation between the imaginary tracks TR and the recording tracks RR is shown in FIG. 15. The imaginary tracks TR are shown in (A) in FIG. 15. In (B) in FIG. 15, a tilt occurs in the plus direction. In (C) in FIG. 15, a tilt occurs in the minus direction.

In (B) in FIG. 15, since the tilt occurs in the tilt plus direction, the track shift amount δ for two tracks occurs in the plus direction relatively to the imaginary tracks TR. In (C) in FIG. 15, since a tilt occurs in the tilt minus direction, the track shift amount δ for two tracks occurs in the shift minus direction relatively to the imaginary tracks TR.

In (B) and (C) in FIG. 15, the tilts occur in the opposite directions and, as a result, the recording tracks RR shift in opposite directions relatively to the imaginary tracks TR shown in (A) in FIG. 15. Therefore, between the recording tracks RR shown in (B) and (C) in FIG. 15, as shown in (D) in FIG. 15, a shift twice as large as the track shift amount δ, i.e., a shift for four tracks in total occurs.

Figure 16:
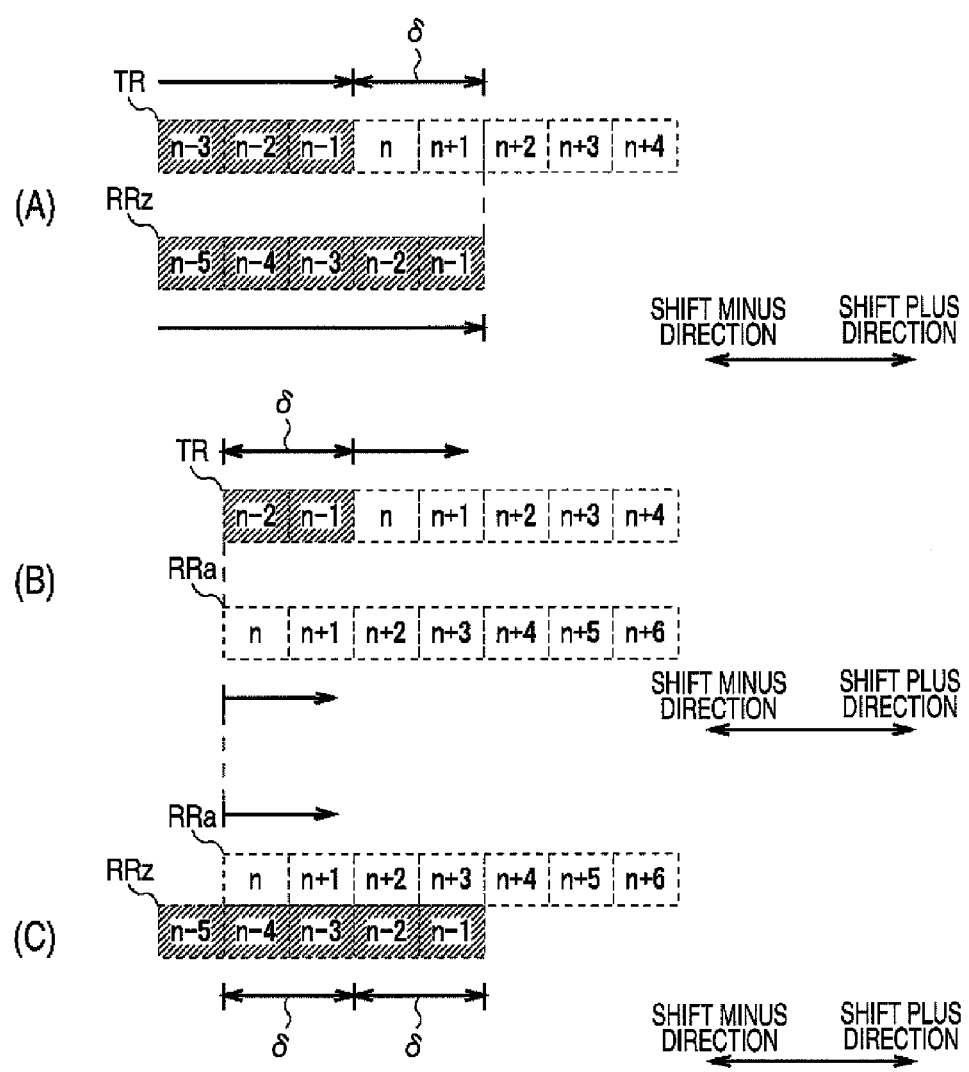
FIG. 16 is a schematic diagram for explaining a change in a tilt occurrence state and overwrite.

As shown in FIG. 16, for example, in a state in which a tilt occurs in the tilt plus direction, the last information recording processing is executed and, in a state in which a tilt occurs in the tilt minus direction, the present information recording processing is executed.

As shown in (A) in FIG. 16, the tilt in the plus direction occurs in the last information recording processing and, as a result, the recorded tracks RRz shift in the plus direction by two tracks and the track shift amount δ for two tracks occurs between the recorded tracks RRz and the target tracks TRt. For example, the recorded track RRz(n−1) is located in the imaginary track TR(n+1) shifting from the imaginary track TR(n−1) by two tracks.

The optical disc device 20 manages presence or absence of a record of information according to the imaginary tracks TR. Therefore, regardless of the fact that the tilt occurs in the last information recording processing and, as a result, information is actually recorded up to a position corresponding to the imaginary track TR(n+1), the optical disc device 20 recognizes that information is recorded only up to the imaginary track TR(n−1).

As shown in (B) in FIG. 16, in the present information recording processing, the tilt in the tilt minus direction opposite to that in the last time occurs and, as a result, the recording planned tracks RRa shift in the shift minus direction from the imaginary tracks TR and the track shift amount δ for two tracks occurs between the recording tracks RRa and the imaginary tracks TR. For example, the recording planned track RRa(n) is located in the imaginary track TR(n+2) shifting from the target track TR(n) by two tracks.

As a result, as shown in (C) in FIG. 16, viewed from the recorded tracks RRz, the recording planned tracks RRa are located to shift in the shift minus direction by four tracks.

Therefore, if the optical disc device 20 that recognizes that information is recorded only up to the imaginary track TR(n−1) starts recording from the next target track (n), the optical disc device 20 starts recording from a recorded track RR(n−4) and overwrites information for four tracks.

It can be said that, in the recording layer 101, when tilts occur in opposite directions, it is likely that information is overwritten up to an amount twice as large as the track shift amount δ corresponding to the occurrence of the tilts.

Figure 17:
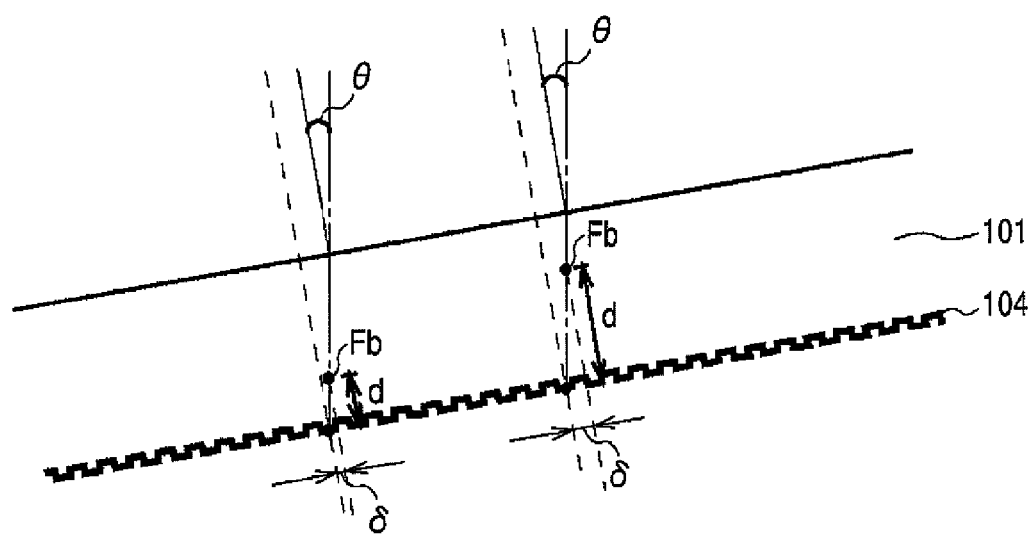
FIG. 17 is a schematic diagram for explaining depth and a track shift amount.

As shown in FIG. 17, the track shift amount δ changes according to the depth d of the focus Fb of the blue light beam Lb1 from the servo layer 104 in the recording layer 101. When the depth d of the focus Fb increases, the track shift amount δ also increases and, when the depth d of the focus Fb decreases, the track shift amount δ also decreases.

Figure 18:
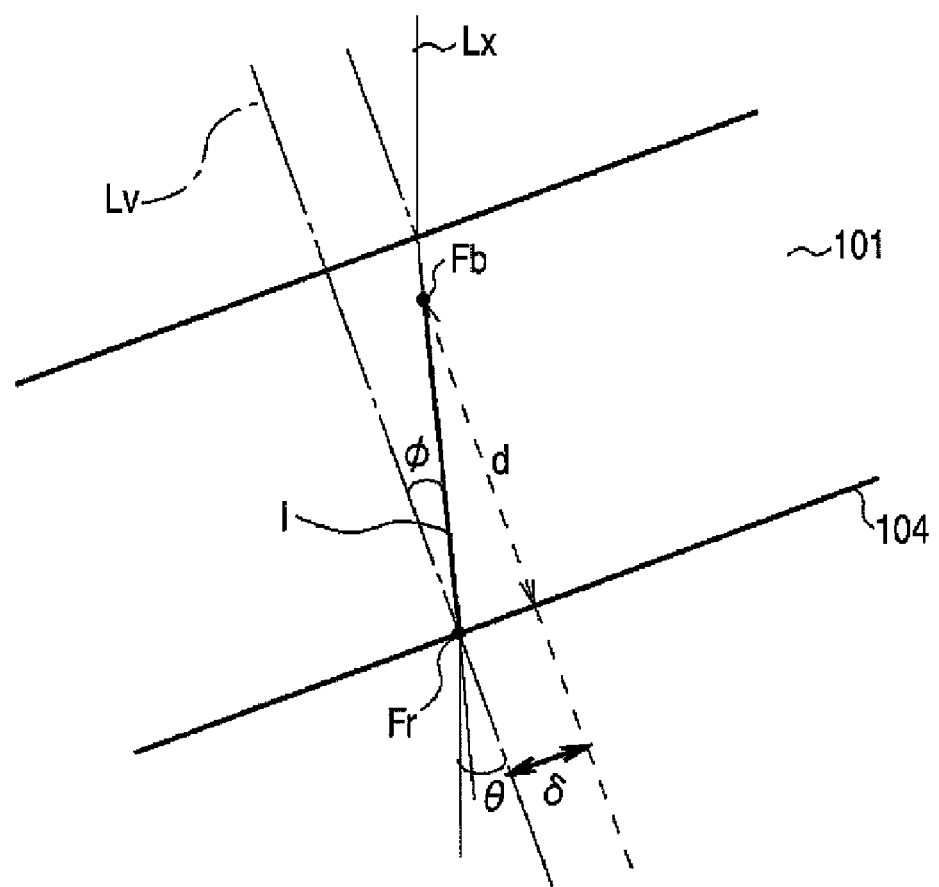
FIG. 18 is a schematic diagram for explaining calculation of a necessary number of guard tracks.

As shown in FIG. 18, the depth of the focus Fb is represented as d, a refractive index of the recording layer 101 is represented as n, and an angle of the optical axis Lx of the blue light beam Lb1 (hereinafter referred to as tilt amount) with respect to a perpendicular Lv of the optical disc 100 (hereinafter referred to as disc perpendicular) is represented as θ. Then, an angle φ with respect to the disc perpendicular Lv of the optical axis Lx in the recording layer 101 (hereinafter referred to as intra-recording layer angle) can be represented by Formula (1) according to the Snell's Law.

$$\sin\theta = n \times \sin\phi \quad (1)$$

It is assumed that the tilt amount θ and the intra-recording layer angle φ are very small values smaller than 1°. Therefore, when sin θ and sin φ are approximated to θ and φ, respectively, Formula (1) can be represented as Formula (2).

$$\theta \approx n \times \phi \quad (2)$$

When Formula (2) is transformed, it can be represented as Formula (3).

$$\phi \approx \theta/n \quad (3)$$

When the track shift amount δ is regarded as one side in a right triangle having an oblique side 1, the track shift amount δ can be represented as Formula (4) by using the depth d of the focus Fb and the inter-recording layer angle φ.

$$\delta = d \times \tan\phi \quad (4)$$

When tan φ is approximated to φ in the same manner as sin φ, Formula (4) can be represented as Formula (5).

$$\delta \approx d \times \phi \quad (5)$$

When Formula (5) is substituted in Formula (4), Formula (5) can be represented as Formula (6).

$$\delta \approx d \times \theta/n \quad (6)$$

Consequently, it is possible to calculate the track shift amount δ from the tilt amount θ, the refractive index n of the recording layer 101, and the depth d of the focus Fb according to Formula (6).

In the recording layer 101, it is likely that information is overwritten up to an amount twice as large as the track shift amount δ. Therefore, the optical disc device 20 prevents overwrite by providing guard tracks, in which the recording marks RM are not formed, in a number twice or more as large as an assumed maximum tilt amount θ (hereinafter referred to as assumed tilt amount $\theta_{MAX}$).

When the assumed tilt amount is represented as $\theta_{MAX}$ (θ is radian), it is possible to calculate a number GN of guard tracks necessary for preventing overwrite according to Formula (7).

A minimum value among positive integers satisfying Formula (7) is set as a necessary number of guard tracks $GN_{MIN}$.

$$GN \geq 2d \times \theta_{MAX}/n \quad (7)$$

where, GN is a positive integer.

The track shift amount δ calculated when the assumed tilt amount $\theta_{MAX}$ is 0.3° (0.3°/360×2π[rad]), the refractive index n of the recording layer 101 is 1.5, the thickness p3 of the mark recording layer is 25 [μm], and the number of mark recording layers is twenty is shown in FIG. 19. A value obtained by converting the track shift amount δ into the number of tracks by setting a track pitch of the imaginary tracks TR in the recording layer 101 to 0.37 [μm] and a necessary number of guard tracks $GN_{MIN}$ in each of the mark recording layers are also shown in FIG. 19.

In FIG. 19, taking into account the fact that it is likely that the depth d of the focus Fb fluctuates in the mark recording layers according to occurrence of a tilt, the thickness p3 (25 [μm]) of the mark recording layer is multiplied with a layer number of the mark recording layer to obtain the depth d. If the focus Fb is considered to be irradiated on respective centers of the mark recording layers, a value obtained by subtracting a half of the thickness p from a value obtained by multiplying the thickness p3 with the layer number can be set as the depth d.

In the figure, counted from the servo layer 104 side, the mark recording layer with the layer number 1 is described as "Layer 1", the mark recording layer with the layer number 2 is described as "Layer 2", the mark layer with the layer number 3 is described as "Layer 3", and so on.

Figure 20:
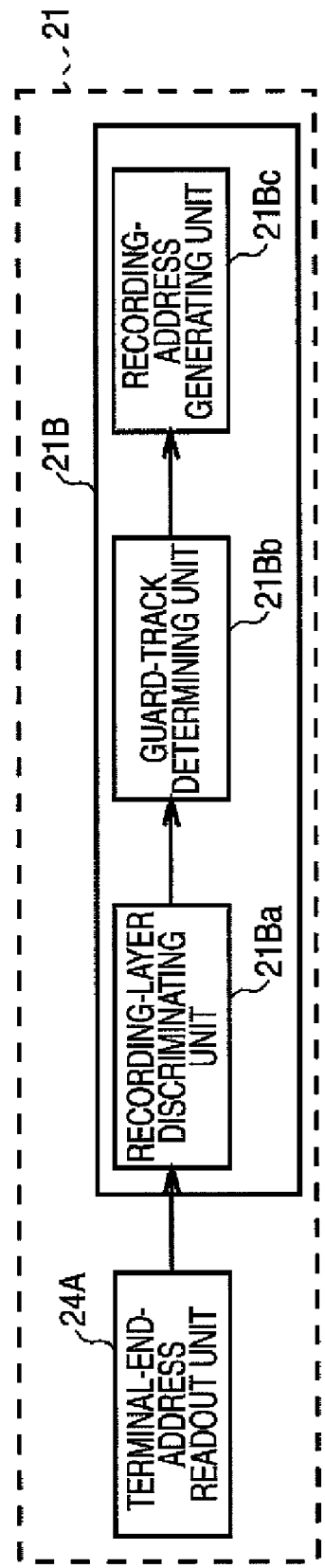
FIG. 20 is a schematic diagram showing a configuration of a control unit.

Specifically, as shown in FIG. 20, the control unit 21 of the optical disc device 20 starts information recording processing and reads out terminal end address information representing the terminal end of the recorded tracks RRz with a terminal-end-address readout unit 21A. The control unit 21 generates, with a target-position setting unit 21B, recording address information representing the next target mark position to separate the terminal end of the recorded tracks RRz and the start end of the recording planned tracks RRa by a set number of guard tracks.

A recording-layer discriminating unit 21Ba of the target-position setting unit 21 discriminates a mark recording layer in which an address represented by the terminal end address information is present.

The control unit 21 stores in advance the mark recording layers and the necessary number of guard tracks $GN_{MIN}$ in association with each other in a ROM (not shown). A guard-track determining unit 21Bb of the target-position setting unit 21 selects the necessary number of guard tracks $GN_{MIN}$ corresponding to the mark recording layers and determines this as the set number of guard tracks.

Consequently, the guard-track determining unit 21B can set the guard tracks GT by the necessary number of tracks $GN_{MIN}$ corresponding to the depth d of the mark recording layers.

The recording-address generating unit 21Bc of the target-position setting unit 21 generates recording address information representing an address that is the set number of guard tracks behind (on the outer circumferential side of) the address of the terminal end of the recorded tracks RRz represented by the terminal end address information.

Consequently, the target-position setting unit 21 can set an address ahead of the terminal end address information as a target mark position where recording is started and can provide the guard tracks GT between the terminal end of the recorded tracks RRz and the recording planned tracks RRa.

Figure 21:
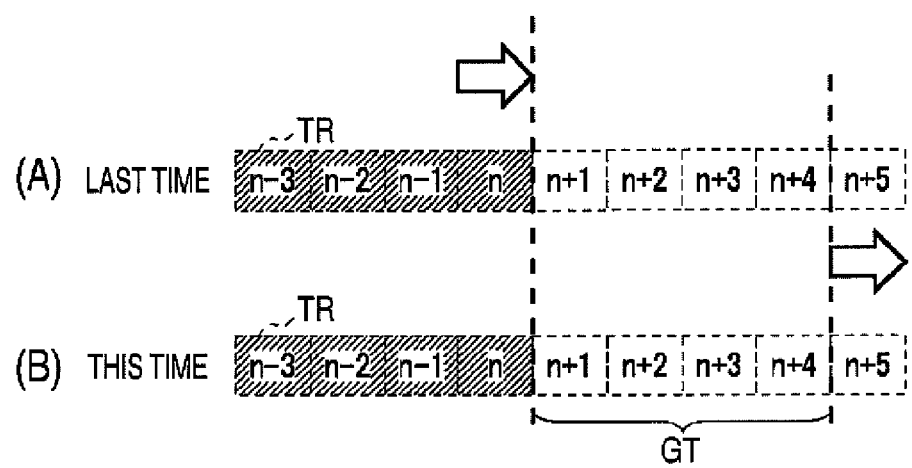
FIG. 21 is a schematic diagram for explaining setting of a guard track.

For example, as shown in FIG. 21, when the terminal end address information represents the end of the imaginary track TR(n) in the seventh mark recording layer, the target-position setting unit 21 generates recording address information representing the beginning of an imaginary track TR(n+5) four tracks ahead of the next imaginary track TR(n+1).

In this case, the target-position setting unit 21 can set four tracks in total from the imaginary track TR(n+1) to the imaginary track TR(n+4) as the guard tracks GT.

Practically, the control unit 21 manages the terminal address information and the recording address information in sector units. Therefore, the recording-address generating unit 21Bc generates the recording address information by calculating the number of sectors corresponding to the set number of guard tracks according to a position in the radial direction of the optical disc 100 and adding the number of sectors to the terminal end address information.

Consequently, the control unit 21 can separate the recorded tracks RRz and the recording planned tracks RRa. Therefore, the control unit 21 can prevent overwrite without causing the recording track RR formed in the last information recording processing and the recording track RR formed in the present information recording processing to overlap.

At this point, the control unit 21 sets the guard tracks GT by the necessary number of guard tracks $GN_{MIN}$. As a result, the control unit 21 can surely prevent overwrite even when the assumed tilt amount $\theta_{MAX}$ in one direction occurs when the last information recording processing is applied to the optical disc 100 and the assumed tilt amount $\theta_{MAX}$ in the opposite direction occurs when the present information recording processing is applied.

In this way, the optical disc device 20 can absorb, with the guard tracks GT, a shift of the recording tracks RR from the imaginary tracks TR and prevent overwrite due to the overlapping recording tracks RR by providing the guard track GT among the recording tracks RR in every information recording processing in which a state of occurrence of a tilt is likely to change.

The optical disc device 20 can surely prevent overwrite by determining the set number of guard tracks to satisfy Formula (7) according to the depth d of the mark recording layers such that positions of the terminal end of the recorded tracks RRz and the start end of the recording planned tracks RRa, which shift from the imaginary tracks TR according to the occurrence of a tilt, fit in the guard tracks GT without overlapping each other.

(3) Operations and Effects

In the configuration described above, the optical disc device 20 irradiates the red light beam Lr1 and the blue light beam Lb1 on the optical disc 100 having the recording layer 101 in which information is recorded and the servo layer 104 that is the positioning layer in which the tracks for specifying a recording position of information in the recording layer 101 are provided.

The optical disc device 20 irradiates the blue light beam Lb1 on the target mark position in the recording layer 101 to record the information by shifting, while focusing the red light beam Lr1 as the predetermined light beam for positioning on a desired track of the servo layer 104, a position in the optical axis direction of the blue light beam Lb1 as the light beam for information, which shares the optical axis with the red light beam Lr1, from the servo layer 104.

The optical disc device 20 recognizes, when information recording processing for recording new information in the recording layer 101 having the recorded tracks RRz as the recorded area in which information is already recorded is started, the terminal end of the recorded tracks RRz according to address information represented by the terminal end address information as the terminal end information. The optical device 20 sets the target mark position to separate, by the set number of guard tracks as an arbitrary number of guard tracks, the terminal end of the recorded tracks RRz and the start end of recording planned tracks RRa in which information is recorded anew.

Consequently, the optical disc device 20 can provide the guard tracks GT in every information recording processing in which a state of occurrence of a tilt (i.e., the tilt amount θ and a tilt direction) in the optical disc 100 is likely to change.

In the optical disc device 20, when a tilt occurs, the recorded tracks RRz on which the recording marks RM are actually recorded and the recording planned tracks RRa shift from the virtual tracks TR on which the recording marks RM are assumed to be recorded in the recording layer 101.

Even in such a case, the optical disc device 20 can form, in the guard tracks GT, the recording marks at the terminal end of the recorded tracks RRz and the start end of the recording planned tracks RRa formed to shift from the imaginary tracks TR. As a result, the optical disc device 20 can prevent overwrite due to the overlapping recording marks RM at the terminal end of the recorded tracks RRz and the start end of the recording planned tracks RRa.

When an assumed tilt amount as a maximum tilt amount to be assumed is represented as $\theta_{MAX}$, a distance between the positioning layer and the target mark position (i.e., the depth of the target mark position) is represented as d, a refractive index of the recording layer is represented as n, and the number of guard tracks is represented as GN, the optical disc device 20 determines the number of guard tracks GN satisfying Formula (7) as the set number of guard tracks.

Consequently, even when a tilt amount of the optical disc 100 is the assumed tilt amount $\theta_{MAX}$ and a direction of shift of the recorded tracks RRz and a direction of shift of the recording planned tracks RRa are opposite to each other, the optical disc device 20 can absorb, with the guard tracks GT, the track shift amount δ between the recorded tracks RRz and the recording planned tracks RRa and surely prevent overwrite.

Moreover, since the necessary number of guard tracks as a minimum value among the numbers of guard tracks satisfying Formula (7) is selected as the set number of guard tracks, the optical disc device 20 can provide only a minimum necessary number of guard tracks GT and prevent a recording capacity of the optical disc 100 from decreasing as much as possible.

The track shift amount δ changes according to the depth d of the target mark position, which is a distance between the servo layer 104 and the target mark position, even when the tilt amount θ is the same in the optical disc 100. The optical disc device 20 can provide, by determining the set number of guard tracks according to the depth d of the target mark position, only a minimum necessary number of guard tracks GT corresponding to the depth d and prevent a recording capacity of the optical disc 100 from decreasing as much as possible.

The optical disc device 20 can easily and accurately recognize, by reading out terminal address information representing the terminal end of the recorded tracks RRz recorded in the recording layer 101 in advance, the terminal end of the recorded tracks RRz on the basis of the terminal end address information.

Moreover, the optical disc device 20 can provide only a minimum necessary number of guard tracks GT by setting a position ahead of the terminal end of the recorded tracks RRz by the set number of guard tracks and prevent a recording capacity of the optical disc 100 from decreasing as much as possible.

In the optical disc device 20 of a so-called reference servo system that forms the recording marks RM in the target mark position at the predetermined depth d from the servo layer 104 relative to tracks formed in the servo layer 104, the recording tracks RR shift from the imaginary tracks TR in the recording layer 101 because of occurrence of a tilt. With the configuration described above, it is possible to realize an optical disc device 20 and a recording method that prevent the recording tracks RR from overlapping one another and prevent overwrite by providing the guard tracks GT among the recording tracks RR in every information recording processing in which a state of occurrence of a tilt is likely to change.

(4) Other Embodiments

In the embodiment described above, the guard tracks are provided by the necessary number of guard tracks $GN_{MIN}$ corresponding to the mark recording layers. However, the present invention is not limited to this. Guard tracks equal to or larger than the necessary number of guard tracks $GN_{MIN}$ only have to be provided. For example, guard tracks in a necessary number of guard tracks in a deepest mark recording layer may be typically provided. Even in this case, effects same as those in the embodiment described above can be obtained.

Figure 22:
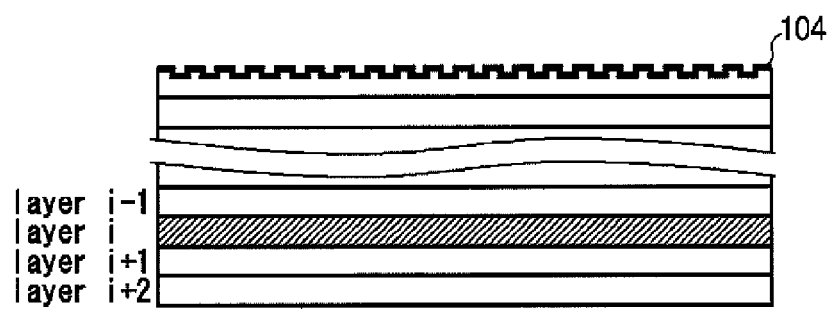
FIG. 22 is a schematic diagram showing a state of a recording mark layer.

All remaining tracks of a mark recording layer in which an end portion of the recording tracks RR is formed in the last information recording processing may be set as guard tracks. In this case, for example, as shown in FIG. 22, a mark recording layer subjected to information recording processing at present is represented as "Layer i" and mark recording layers subjected to the information recording processing earlier than the "Layer i" are represented as "Layer i−1", "Layer i−2", and so on in order. Mark recording layers subjected to the information recording processing later than the "Layer i" are represented as "Layer i+1", "Layer i+2", and so on in order.

Figure 23:
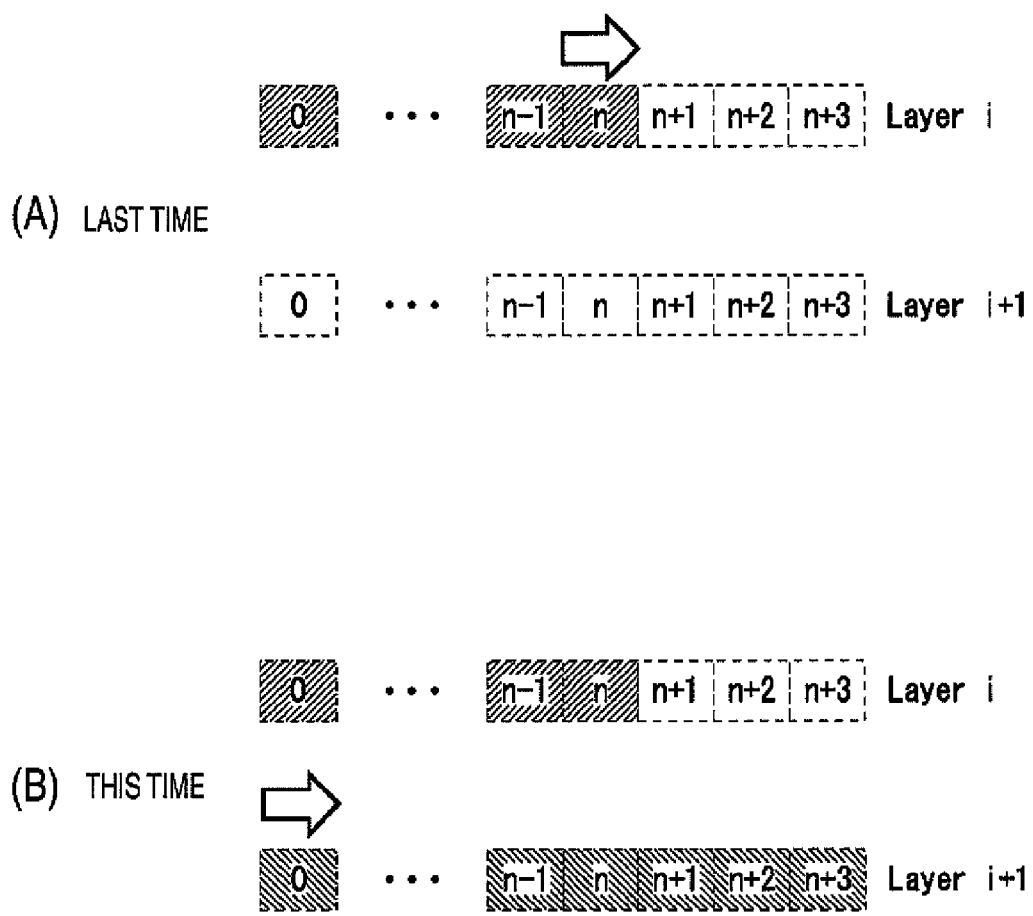
FIGS. 23A and 23B are schematic diagrams for explaining setting of a guard track according to another embodiment of the present invention.

When the information recording processing is started, the control unit 21 reads out the terminal address information with the terminal-end-address readout unit 21A. As shown in FIGS. 23A and 23B, the control unit 21 discriminates, with the recording-layer discriminating unit 21Ba, which of the mark recording layers the mark recording layer "Layer i" including an address represented by the terminal end address information is. The control unit 21 determines, with the guard-track determining unit 21Bb, that the remaining portion of the "Layer i" is set as guard tracks.

The control unit 21 generates, with the recording-address generating unit 21Bc, address information representing a top portion of a mark recording layer "Layer i+1" next to the mark recording layer "Layer i", which is represented by the terminal end address information, as recording address information.

In this way, the optical disc 100 has the plural mark recording layers, which are assumed layers in which information is assumed to be recorded in a layered shape, in the optical axis direction of the blue light beam Lb1. The control unit 21 sets, as the target mark position, the start end of a mark recording layer next to the mark recording layer in which the terminal end of the recorded tracks RRz is present. Consequently, effects same as those in the embodiment described above can be obtained.

In the embodiment described above, the position ahead of the terminal end of the recorded tracks RRz by the set number of guard tracks is set as the target mark position. However, the present invention is not limited to this. For example, it is also possible that, when the information recording processing is finished, an address (i.e., a recording start position) behind the terminal end of the recorded tracks RRz by the set number of guard tracks is recorded as terminal end address information and, when the next information recording processing is started, the target mark position is set with the recording start position designated by the terminal end address information set as the start end of the recording planned tracks RRa. Even in this case, effects same as those in the embodiment described above can be obtained.

In the embodiment described above, the terminal end of the recorded tracks RRz is recognized according to the terminal end address information. However, the present invention is not limited to this. A method of recognizing the terminal end is not limited. It is also possible to recognize the terminal end of the recorded track RRz by, for example, moving the object lens 40 in the focus direction, the tracking direction, or both of the directions and recognizing presence or absence of the recording marks RM.

In the embodiment described above, information is not recorded in the guard tracks GT. The present invention is not limited to this. For example, when the optical disc 100 is a rewritable type, dummy data may be recorded in the guard tracks GT.

In the embodiment described above, the set number of guard tracks is determined to satisfy Formula (2). However, the present invention is not limited to this. The set number of guard tracks does not always have to satisfy Formula (2).

In the embodiment described above, the necessary number of guard tracks associated with the mark recording layers is stored in the ROM in advance. However, the present invention is not limited to this. For example, the guard-track determining unit 21Bb may calculate the necessary number of guard tracks from the depth d of the mark recording layers using Formula (2).

In the embodiment described above, the guard tracks are provided in every information recording processing. However, the present invention is not limited to this. In short, the guard tracks only have to be provided when a state of occurrence of a tilt is likely to change. For example, the guard tracks may be provided only when it is detected that the optical disc 100 is reinserted.

In the embodiment described above, the red light beam Lr1 having the wavelength of 660 [nm] is used as the light beam for positioning and the blue light beam Lb1 having the wavelength of 405 [nm] is used as the light beam for information. However, the present invention is not limited to this. A light beam having optimum wavelength can be selected and used as appropriate.

For example, it is also possible to use a blue light beam having the wavelength of 405 [nm] as both the light beam for positioning and the light beam for information. In this case, in the servo layer 104, single spiral tracks with a track pitch of 0.32 [μm] suitable for the blue light beam are formed. Tracking control is executed to focus the light beam for positioning on grooves. Consequently, the recording marks RM are also formed at the same track pitch of 0.32 [μm] in the recording layer 101. The necessary number of guard tracks $GN_{MIN}$ in this case is shown in FIG. 21.

In the embodiment described above, recorded information is managed by sectors. However, the present invention is not limited to this. The recorded information may be managed for each of tracks.

In the embodiment described above, the thickness p3 of the mark recording layers is 25 [μm] and the number of layers is twenty. However, the present invention is not limited to this. The thickness p and the number of layers can be selected as appropriate according to a recording capacity of the optical disc 100, the wavelength of the light beam for information, and the like.

In the embodiment described above, one light beam for information is irradiated in the recording layer 101 and the recording marks RM are formed according to the fluctuation in a refractive index of the light beam for information. However, the present invention is not limited to this. For example, interference fringes formed by superimposing two light beams for information from opposite side each other may be recorded as the recording marks RM formed by holograms.

In the embodiment described above, the servo layer 104 is provided between the substrate 102 on the object lens 40 side and the recording layer 101. However, the present invention is not limited to this. The servo layer 104 may be provided between the substrate 103 on the opposite side of the object lens 40 and the recording layer 101.

In the embodiment described above, the recording marks RM are formed in the optical disc 100. However, the present invention is not limited to this. For example, the recording marks RM may be recorded in an optical information recording medium formed in a cubic shape.

In the embodiment described above, the optical disc device 20 is configured by the optical pickup 26 as the information recording unit, the terminal-end-address readout unit 21A as the terminal-end recognizing unit, and the target-position setting unit 21B as the target-position setting unit. However, the present invention is not limited to this. The optical disc device according to the present invention may be configured by an information recording unit, a terminal-end recognizing unit, and a target-position setting unit having various other configurations.

The present invention can be used in an optical disc device that records large-capacity information such as video content or sound content in a recording medium such as an optical disc or reproduces the large-capacity information from the recording medium.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical disc device that irradiates a light beam on an optical disc having a recording layer in which information is recorded and a positioning layer in which tracks for specifying a recording position of the information in the recording layer are provided, the optical disc device comprising:
   an information recording unit that irradiates a second light beam for information on a target position in the recording layer to record the information by shifting a position in an optical axis direction of the second light beam for information from the positioning layer while focusing a first light beam for positioning on a desired track of the positioning layer, the optical axis direction of the second light beam for information sharing an optical axis with the first light beam for positioning;
   a terminal-end recognizing unit that recognizes, when new information is recorded in the recording layer having a recorded area in which information is already recorded, a terminal end of the recorded area; and
   a target-position setting unit that sets the target position to separate, by an arbitrary number of guard tracks, the terminal end of the recorded area and a start end of a recording planned area in which information is recorded anew.

2. The optical disc device according to claim 1, wherein the target-position setting unit determines, when a maximum tilt amount to be assumed is represented as $\theta_{MAX}$, a distance between the positioning layer and the target position is represented as d, a refractive index of the recording layer is represented as n, and a number of guard tracks is represented as GN, the number of guard tracks satisfying a formula:

$$GN \geq 2d \times \theta_{MAX}/n$$

where GN is a positive integer.

3. The optical disc device according to claim 2, wherein the number of guard tracks is a minimum value among numbers of guard tracks satisfying the formula.

4. The optical disc device according to claim 3, wherein the target-position setting unit determines the number of guard tracks according to the distance between the positioning layer and the target position.

5. The optical disc device according to claim 4, wherein the terminal-end recognizing unit recognizes the terminal end of the recorded area on the basis of terminal end information representing the terminal end of the recorded area recorded in the recording layer in advance.

6. The optical disc device according to claim 5, wherein the target-position setting unit sets a position behind the terminal end of the recorded area by the number of guard tracks as the target position.

7. The optical disc device according to claim 4, wherein the target-position setting unit sets the target position with a recording start position designated by the terminal end information set as the start end of the recording planned area.

8. The optical disc device according to claim 2, wherein the recording layer has a plurality of assumed layers, in which the information is assumed to be recorded in a layered shape, in an optical axis direction of the second light beam for information, and the target-position setting unit sets, as the target position, a start end of an assumed area next to an assumed layer in which the terminal end of the recorded area is present.

9. An optical information recording method for irradiating, on an optical disc having a recording layer in which information is recorded and a positioning layer in which tracks for specifying a recording position of the information in the recording layer are provided, a second light beam for information on a target position in the recording layer to record the information by shifting a position in an optical axis direction of the second light beam for information from the positioning layer while focusing a first light beam for positioning on a desired track of the positioning layer, the optical axis direction of the second light beam for information sharing an optical axis with the first light beam for positioning, the optical information recording method comprising:

recognizing, when new information is recorded in the recording layer having a recorded area in which information is already recorded, a terminal end of the recorded area; and setting the target position to separate, by an arbitrary number of guard tracks, the terminal end of the recorded area and a start end of a recording planned area in which information is recorded anew.

* * * * *